US011481617B2

(12) United States Patent
Singh et al.

(10) Patent No.: US 11,481,617 B2
(45) Date of Patent: Oct. 25, 2022

(54) GENERATING TRAINED NEURAL NETWORKS WITH INCREASED ROBUSTNESS AGAINST ADVERSARIAL ATTACKS

(71) Applicant: Adobe Inc., San Jose, CA (US)

(72) Inventors: Mayank Singh, Noida (IN); Nupur Kumari, Noida (IN); Dhruv Khattar, Chandigarh (IN); Balaji Krishnamurthy, Noida (IN); Abhishek Sinha, Noida (IN)

(73) Assignee: Adobe Inc., San Jose, CA (US)

( * ) Notice: Subject to any disclaimer, the term of this patent is extended or adjusted under 35 U.S.C. 154(b) by 906 days.

(21) Appl. No.: 16/253,561

(22) Filed: Jan. 22, 2019

(65) Prior Publication Data

US 2020/0234110 A1 Jul. 23, 2020

(51) Int. Cl.
*G06N 3/08* (2006.01)
*G06N 20/00* (2019.01)
*H04L 9/40* (2022.01)

(52) U.S. Cl.
CPC ............... *G06N 3/08* (2013.01); *G06N 20/00* (2019.01); *H04L 63/1441* (2013.01)

(58) Field of Classification Search
CPC ....... G06N 3/08; G06N 20/00; H04L 63/1441
See application file for complete search history.

(56) References Cited

U.S. PATENT DOCUMENTS

| | | | |
|---|---|---|---|
| 2019/0086912 A1* | 3/2019 | Hsu | G06N 3/084 |
| 2020/0074296 A1* | 3/2020 | Singh | G06N 20/00 |
| 2021/0097393 A1* | 4/2021 | Wang | G06N 3/0454 |

OTHER PUBLICATIONS

Krizhevsky, Alex, Ilya Sutskever, and Geoffrey E. Hinton. "Imagenet classification with deep convolutional neural networks." In Advances in neural information processing systems, pp. 1097-1105. 2012.
Ian J. Goodfellow, Jonathon Shlens and Christian Szegedy, Explaining and Harnessing Adversarial Examples, arXiv preprint arXiv:1412.6572v3,2015.
Tramèr, Florian, Alexey Kurakin, Nicolas Papernot, Ian Goodfellow, Dan Boneh, and Patrick McDaniel. "Ensemble adversarial training: Attacks and defenses." arXiv preprint arXiv:1705.07204 (2017).

(Continued)

*Primary Examiner* — Olugbenga O Idowu
(74) *Attorney, Agent, or Firm* — Keller Preece PLLC

(57) ABSTRACT

The present disclosure relates to systems, methods, and non-transitory computer readable media for generating trained neural network with increased robustness against adversarial attacks by utilizing a dynamic dropout routine and/or a cyclic learning rate routine. For example, the disclosed systems can determine a dynamic dropout probability distribution associated with neurons of a neural network. The disclosed systems can further drop neurons from a neural network based on the dynamic dropout probability distribution to help neurons learn distinguishable features. In addition, the disclosed systems can utilize a cyclic learning rate routine to force copy weights of a copy neural network away from weights of an original neural network without decreasing prediction accuracy to ensure that the decision boundaries learned are different.

9 Claims, 14 Drawing Sheets

(56) References Cited

OTHER PUBLICATIONS

Moosavi-Dezfooli, Seyed-Mohsen, Alhussein Fawzi, and Pascal Frossard. "Deepfool: a simple and accurate method to fool deep neural networks." Proceedings of the IEEE Conference on Computer Vision and Pattern Recognition. 2016.
Madry, Aleksander, Aleksandar Makelov, Ludwig Schmidt, Dimitris Tsipras, and Adrian Vladu. "Towards deep learning models resistant to adversarial attacks." arXiv preprint arXiv:1706.06083 (2017).
Eykholt, Kevin, Ivan Evtimov, Earlence Fernandes, Bo Li, Dawn Song, Tadayoshi Kohno, Amir Rahmati, Atul Prakash, and Florian Tramer. "Note on attacking object detectors with adversarial stickers." arXiv preprint arXiv:1712.08062 (2017).
Garipov, Timur, Pavel Izmailov, Dmitrii Podoprikhin, Dmitry P. Vetrov, and Andrew Gordon Wilson. "Loss Surfaces, Mode Connectivity, and Fast Ensembling of DNNs." arXiv preprint arXiv:1802.10026 (2018).
Aleksander Madry, Aleksandar Makelov, Ludwig Schmidt, Dimitris Tsipras, Adrian Vladu. "Towards Deep Learning Models Resistant to Adversarial Attacks". arXiv preprint arXiv:1706.06083.

\* cited by examiner

| Adversarial Attack | Model N | Model A |
|---|---|---|
| FGSM | 5.84 | 26.3 |
| DeepFool | 2.34 | 5.59 |
| PGD | 0 | 10.84 |

*Fig. 7A*

| Adversarial Attack | Model N | Model A |
|---|---|---|
| FGSM | 38.4 | 58.58 |
| DeepFool | 96.64 | 97.41 |
| PGD | 20.74 | 59.68 |

*Fig. 7B*

| Adversarial Attack | Model N | Model A |
|---|---|---|
| FGSM | 5.84 | 14.2 |
| DeepFool | 2.34 | 81.48 |
| PGD | 0 | 0.1 |

*Fig. 10A*

| Adversarial Attack | Model N | Model A |
|---|---|---|
| FGSM | 38.4 | 44.07 |
| DeepFool | 96.64 | 97.1 |
| PGD | 20.74 | 51.65 |

*Fig. 10B*

GENERATING TRAINED NEURAL NETWORKS WITH INCREASED ROBUSTNESS AGAINST ADVERSARIAL ATTACKS

BACKGROUND

Recently, neural networks have seen a huge surge in their adoption due to their ability to provide high accuracy on various tasks. Particularly, deep learning neural networks perform remarkably well in several domains such as computer vision, natural language processing, and speech recognition. Due to the adoption of deep neural networks in diverse fields, the robustness and security of these neural networks is a major issue. For reliable application of deep neural networks in the domain of security, for example, robustness against adversarial attacks needs to be well established.

Advancements in software and hardware platforms have led to a variety of improvements in systems that generate and train neural networks for improved robustness. For example, neural network systems are now able to improve neural network security by implementing training techniques to protect against adversarial attacks. Amid efforts to improve these neural network systems, some systems can, for example, perform adversarial training in which adversarial examples are dynamically added to training data during the training process.

Despite these advances however, conventional neural network systems continue to suffer from a number of disadvantages, particularly in their accuracy and efficiency. Indeed, while some conventional systems improve the security of neural networks to some degree, these systems nevertheless exhibit susceptibility to adversarial attacks in many circumstances. For example, many deep neural networks are highly vulnerable to adversarial attacks in which hand-crafted "noisy" input causes the neural networks to behave abnormally. As a result of inadequate robustness, many of these systems generate predictions that, even in cases where the adversarial attack input is subtle or imperceptible to humans, cause neural networks to generate inaccurate predictions or classifications.

Moreover, many conventional neural network systems are also inefficient. For example, to improve robustness of neural networks against adversarial attacks, some resent systems employ adversarial training using a projected gradient descent technique. However, such adversarial training systems are time-consuming and computationally expensive. As a result, the inefficiency of these conventional neural network systems reduces the applicability of these systems in many use cases.

Thus, there are several disadvantages with regard to conventional neural network systems.

SUMMARY

One or more embodiments described herein provide benefits and solve one or more of the foregoing or other problems in the art with systems, methods, and non-transitory computer readable media that efficiently generate neural networks with increased robustness against adversarial attacks by implementing a dynamic dropout routine and/or a cyclic learning rate routine. In particular, in one or more embodiments, the disclosed systems implement a dynamic dropout routine based on a dropout probability distribution. To illustrate, some neurons within a neural network may tend to learn similar features as other neurons. Thus, to ensure that neurons learn distinct features, the disclosed systems can determine a dynamic dropout probability distribution for a dropout routine such that the neurons learn disentangled features.

In addition (or alternatively), the disclosed systems can also implement a cyclic learning rate training routine. As adversarial examples are transferable (i.e., adversarial examples generated from one neural network are effective in attacking a different neural network trained on the same or similar training data), neural networks often learn similar decision boundaries. Thus, the disclosed systems utilize a cyclic learning rate routine by oscillating a learning rate associated with a neural network to ensure that decision boundaries are distinct. As a result of ensuring distinct decision boundaries in this way, the disclosed systems improve adversarial accuracy and reduce the transferability of adversarial attacks, thus improving the robustness of the neural network.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 7A-7B illustrate example results that show improvements provided by the adversarially-robust neural-network training system when using a dynamic dropout routine in accordance with one or more embodiments;

FIGS. 10A-10B illustrate example results that show improvements provided by the adversarially-robust neural-network training system when using a cyclic learning rate routine in accordance with one or more embodiments;

DETAILED DESCRIPTION

Figure 1:
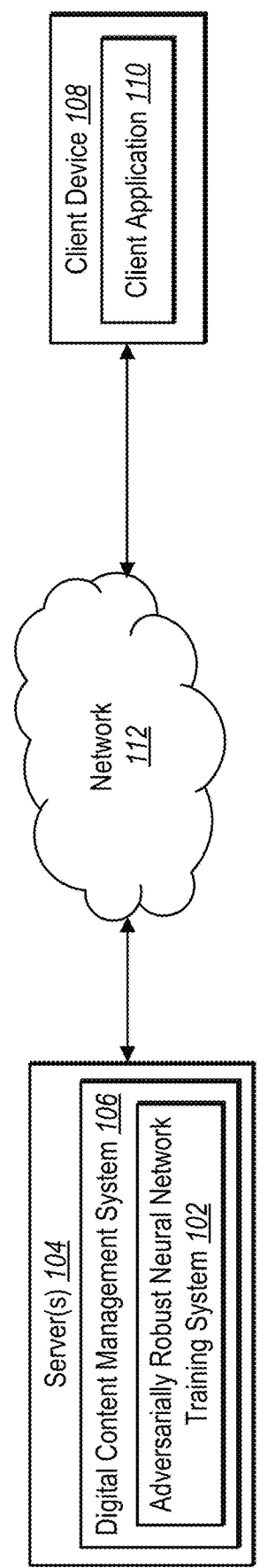
FIG. 1 illustrates an example environment for implementing an adversarially-robust neural-network training system in accordance with one or more embodiments.

One or more embodiments include an adversarially-robust neural-network training system that generates neural networks with improved robustness against adversarial attacks by implementing a dynamic dropout routine and/or a cyclic learning rate routine during training. For the dynamic dropout routine, the adversarially-robust neural-network training system can generate a dropout probability distribution over neurons in a particular layer of a neural network. Indeed, for a neural network to learn distinguishable features, the adversarially-robust neural-network training system ensures that the gradient loss of each label (e.g., classification label) with respect to a given neuron is different for all neurons in the same layer. Additionally (or alternatively), the adversarially-robust neural-network training system can utilize a cyclic learning rate routine to ensure that decision boundaries learned by a neural network are different. For example, the adversarially-robust neural-network training system can initialize a copy of an initially trained neural network with weights equal to the weights of the initially trained neural network and can cyclically modify the learning rate without decreasing prediction accuracy.

With regard to the dynamic dropout routine, the adversarially-robust neural-network training system can access a neural network that includes a plurality of layers, where each layer includes one or more neurons. In addition, the adversarially-robust neural-network training system can determine gradient losses for one or more neurons of the neural network. In particular, the adversarially-robust neural-network training system can determine gradient losses with respect to a plurality of classification labels. Further, the adversarially-robust neural-network training system can generate similarity scores between pairs of neurons within the neural network based on the gradient losses associated with the classification labels. Based on the similarity scores, the adversarially-robust neural-network training system can further determine a dynamic dropout probability distribution associated with one or more neurons within a layer of the neural network. The neural network can further generate a trained neural network that learns distinguishable features based on the dynamic dropout probability distribution.

As mentioned, the adversarially-robust neural-network training system can implement a dynamic dropout routine to train a neural network for increased robustness against adversarial attacks. In particular, for a neural network to learn distinguishable features, the adversarially-robust neural-network training system can utilize the dropout routine to ensure that the gradient loss of each of a set of known labels (e.g., classification labels) is different for all neurons with a given layer of the neural network. Thus, the adversarially-robust neural-network training system can determine gradient losses for each label within a plurality of labels with respect to activations of individual neurons. By ensuring that the gradient losses are different, the adversarially-robust neural-network training system can generate a trained neural network where each neuron learns distinct features so that no two neurons (or fewer neurons) are redundant (e.g., learn the same or too similar features).

In some embodiments, the adversarially-robust neural-network training system can determine the gradient of all losses (with respect to activations) of neurons within the penultimate layer (e.g., the second-to-last layer or the layer before the output layer) of the neural network. By determining the gradient losses in this way, the adversarially-robust neural-network training system can generate a gradient vector that the adversarially-robust neural-network training system utilizes to determine similarity scores between neurons.

Indeed, the adversarially-robust neural-network training system can generate similarity scores between pairs of neurons (e.g., every pair of neurons within the penultimate layer). To generate a given similarity score for a particular neuron, the adversarially-robust neural-network training system can determine cosine similarities between the particular neuron and other neurons (e.g., neurons within the same layer) individually. In addition, the adversarially-robust neural-network training system can generate a sum of the cosine similarities that represents to what extent the particular neuron is similar to the other neurons. The higher the similar score, the higher the probability that the neuron is learning features similar to features learned by another neuron—i.e., the neuron is more likely learning redundant features.

The adversarially-robust neural-network training system can further generate a dynamic dropout probability distribution based on the similarity scores of the neurons within a given layer (e.g., the penultimate layer). In particular, the adversarially-robust neural-network training system can generate a dropout probability distribution that is proportional to the similarity scores of the neurons and that indicates, for each neuron, a probability of dropping the neuron from the neural network. The adversarially-robust neural-network training system can thus determines which neurons to drop out of the neural network based on the dropout probability distribution.

In relation to the cyclic learning rate routine, the adversarially-robust neural-network training system can access a neural network that includes a plurality of weights that indicate decision boundaries associated with the neural network. The adversarially-robust neural-network training system can further initialize a copy neural network with copy weights set equal to the weights of the neural network. In addition, the adversarially-robust neural-network training system can implement a cyclic learning rate routine to force the copy weights away from the weights of the neural network without decreasing prediction accuracy by oscillating the learning rate of the copy neural network between a first learning rate and a second learning rate and sampling the copy weights at a sampling point during the oscillation. Thus, the adversarially-robust neural-network training system can generate a plurality of cyclically trained neural networks with distinct decision boundaries associated with the sampled cyclic weights.

More particularly, the adversarially-robust neural-network training system can train a neural network (e.g., via a conventional training technique or an adversarial training technique) and can then generate a copy of the neural network with copy weights equal to the weights of the neural network. In addition, the adversarially-robust neural-network training system can force the copy weights away from the weights of the neural network without decreasing prediction accuracy.

Indeed, to force the copy weights away from the weights of the neural network, the adversarially-robust neural-network training system can implement a cyclic learning rate routine. For example, the adversarially-robust neural-network training system can oscillate the learning rate of the copy neural network between a first learning rate and a second learning rate. In some embodiments, the adversarially-robust neural-network training system can oscillate the learning rate over one or more training cycles by changing the learning rate from a first learning rate to a second learning rate and back to the first learning rate within a single cycle. In addition, the adversarially-robust neural-network training system can sample or extracts the weights of the copy neural network at a midpoint of a training cycle (e.g., at the second learning rate). Thus, the adversarially-robust neural-network training system can generate a plurality of cyclically trained neural networks based on the weights extracted at the midpoints of the training cycles.

The adversarially-robust neural-network training system provides several advantages over conventional systems. For example, the adversarially-robust neural-network training system can improve accuracy over conventional systems. Indeed, by utilizing a dynamic dropout routine and/or a cyclic learning rate routine, the adversarially-robust neural-network training system trains neural networks to be more robust against adversarial attacks as compared to conventional systems. For instance, the adversarially-robust neural-network training system trains neural networks to have low transferability, disentangled feature learning, and distinct decision boundaries, even under an adversarial attack. Thus, the adversarially-robust neural-network training system generates neural networks that are more accurate whether or not the neural networks are exposed to adversarial attacks. For example, the adversarially-robust neural-network training system generates neural networks that more accurately generate predictions in relation to a variety of domains including computer vision, natural language processing, speech recognition, and security.

In addition, the adversarially-robust neural-network training system improves efficiency relative to conventional systems. More specifically, the adversarially-robust neural-network training system greatly improves training time over conventional systems that utilize projected gradient descent training techniques. Similarly, the adversarially-robust neural-network training system further utilizes fewer computing resources (e.g., processing power, memory, and storage) than conventional systems that utilize projected gradient descent techniques.

As illustrated by the foregoing discussion, the present disclosure utilizes a variety of terms to describe features and benefits of the adversarially-robust neural-network training system. Additional detail is hereafter provided regarding the meaning of these terms as used in this disclosure. In particular, the term "neural network" refers to a trainable computer-based algorithm that analyzes data to make predictions. A neural network can refer to a tunable model that is trained to make predictions based on training data. In particular, a neural network includes a computer-implemented algorithm that analyzes input (e.g., training input) to make predictions and that improves in accuracy by comparing generated predictions against ground truth data or another metric and modifying internal parameters for subsequent predictions. In some embodiments, a neural network can employ supervised learning, while in other embodiments a neural network can employ unsupervised learning or reinforced learning. In the same or other embodiments, a neural network can be a convolutional neural network and/or a deep neural network.

Relatedly, the term "train" refers to utilizing information to tune or teach a neural network. The term "training" (used as an adjective or descriptor, such as "training data" or "training digital image") refers to information or data utilized to tune or teach the model. In some embodiments, the adversarially-robust neural-network training system trains one or more neural networks to generate accurate predictions based on respective training data. To train a neural network, the adversarially-robust neural-network training system utilizes a dynamic dropout routine and/or a cyclic learning rate routine.

A neural network can have a particular architecture. For example, a neural network can be composed of a plurality of layers. As used herein, the term "layer" refers to a collection of nodes or neurons. In particular, a layer can refer to a portion or section of a neural network that includes one or neurons that have the same distance from the input of the neural network. Within a neural network, adjacent layers can communicate with each other, passing information between constituent nodes within the layers in a forward propagation of information and/or back propagation of the information. A layer can refer to an input layer, a hidden layer, or an output layer. The term "penultimate layer" refers to the second-to-last layer within the neural network or the last layer before the output layer, which in some cases refers to the last hidden layer within the neural network.

Relatedly, the term "neuron" refers to a node within a neural network that is associated with or contains a set of inputs, weights, and an activation function. A neuron can translate or transform its relative inputs into an output for providing to another neuron based on its weights. Indeed, a neuron can include a weight vector that includes a number of weights equal to the number of inputs associated with the neuron. During training, the adversarially-robust neural-network training system tunes the weights associated with the neurons to increase the prediction accuracy of the neural network.

To generate predictions, a neural network utilizes neurons to generate features. As used herein the term "feature" refers to a digital encoding of one or more characteristics (e.g., a visual characteristic or an unobservable deep feature characteristic). The term feature includes latent or hidden features utilized by a neural network to generate a prediction (e.g., vectors that are not readily decipherable or comprehensible by humans).

As mentioned, the adversarially-robust neural-network training system trains a neural network to be robust against adversarial attacks. The term "adversarial attack" refers to input for a neural network that is designed to fool the neural network. In particular, an adversarial attack refers to a white box attack and/or a black box attack. In a white box attack, the attacker has the complete knowledge of the model architecture that was used for training as well as the data with which the model was trained. In a black box attack, the attacker has no knowledge of the model architecture used to train for the desired task, and the attacker also does not have access to the data used for training. An adversarial attack can include hand-crafted or computer-crafted input that causes a neural network to behave abnormally—e.g., to classify an input incorrectly. In some embodiments, an adversarial attack includes a noise input that causes perturbations to neural network input which result in inaccurate neural network predictions. Example adversarial attack methods include a fast gradient sign method ("FGSM"), a random FGSM method, a DeepFool method, and/or a projected gradient descent method.

The adversarially-robust neural-network training system can implement a dynamic dropout routine to train a neural network for improved robustness against adversarial attacks.

As used herein, the term "dynamic dropout routine" (or sometimes "dropout routine") refers to a routine or technique that the adversarially-robust neural-network training system implements to determine dropout of a neural network. In particular a dropout routine refers to a technique of dropping (e.g., removing or ignoring) particular neurons (e.g., redundant neurons) out of a neural network during training cycle. As described herein, the adversarially-robust neural-network training system implements a dropout routine according to a dynamic dropout probability distribution. The term "dynamic dropout probability distribution" (or sometimes "dropout probability distribution") refers to a probability distribution that indicates which neurons within a neural network (e.g., within a particular layer of the neural network) learn features similar to the learned features of other neurons (i.e., are redundant) and should therefore be dropped from the neural network during a given training cycle or phase.

Indeed, the adversarially-robust neural-network training system determines similarity scores between neurons. As used herein, the term "similarity score" refers to a degree of similarity or likeness between neurons of a neural network. A similarity score can refer to a measure of how similar learned features of one neuron are with learned features of another neuron. A similar score can also (or alternatively) refer to a measure of how similar a neuron (or learned features of the neuron) is/are to a number of other neurons (or learned features of the other neurons) within the same or a different layer of the neural network. The adversarially-robust neural-network training system can generate similarity scores based on gradient losses for a plurality of classification labels. The term "classification label" (or sometimes "label" or "classification") refers to a label or category of information known to the adversarially-robust neural-network training system. For example, a classification label can refer to a particular label or category that the adversarially-robust neural-network training system utilizes as part of training data to train a neural network to identify or classify digital information as belonging to the particular label or category. In some embodiments, a classification label can refer to a particular category of digital image or a digital object within a digital object (e.g., a person, a dog, a building, etc.).

Additionally (or alternatively) the adversarially-robust neural-network training system implements a cyclic learning rate routine to train a neural network for improved robustness. The term "cyclic learning rate routine" refers to a training technique that adversarially-robust neural-network training system implements to sample weights of a neural network at various sample points within a training cycle. A "training cycle" (or sometimes "cycle") refers to a period (e.g., a number of training iterations, a number of batches, or a period of time) wherein the adversarially-robust neural-network training system oscillates a learning rate of a neural network from a first learning rate value to a second learning rate value and back to the first learning rate value. In some cases, a cycle can refer to an exploration-exploitation cycle where, while the learning rate is large, the neural network explores a weight space in large steps (exploration) and, while the learning rate is small, the neural network recovers its accuracy (exploitation). In some embodiments, the adversarially-robust neural-network training system changes the learning rate in a linear fashion, while in other embodiments the adversarially-robust neural-network training system changes the learning rate in some other fashion. In any event, the adversarially-robust neural-network training system utilizes a learning rate function to modify the learning rate. In addition, the adversarially-robust neural-network training system generates "cyclic weights" which refer to weights of a neural network sampled or extracted at a particular sampling point (e.g., a midpoint) within a training cycle. Additional detail regarding the learning rate function is provided below with reference to the figures.

Relatedly, the term "learning rate" refers to how quickly a neural network forgets or abandons previous predictions for new predictions. A learning rate can refer to how quickly a neural network explores a weight space by modifying the weights associated with various neurons. Larger learning rates can correspond to larger changes to weights within the neural network, while smaller learning rates can correspond to smaller changes to the weights.

Additional detail regarding the adversarially-robust neural-network training system will now be provided with reference to the figures. For example, FIG. 1 illustrates a schematic diagram of an example environment for implementing an adversarially-robust neural-network training system 102 in accordance with one or more embodiments. An overview of the adversarially-robust neural-network training system 102 is described in relation to FIG. 1. Thereafter, a more detailed description of the components and processes of the adversarially-robust neural-network training system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 14.

As mentioned, the environment includes a client device 108. The client device 108 can be one of a variety of computing devices, including a smartphone, tablet, smart television, desktop computer, laptop computer, virtual reality device, augmented reality device, or other computing device as described in relation to FIG. 14. Although FIG. 1 illustrates a single client device 108, in some embodiments the environment can include multiple different client devices, each associated with a different user. The client device 108 can refer to an administrator device and can further communicate with the server(s) 104 via the network 112. For example, the client device 108 can receive user input and other activity information and provide the information pertaining to user activity (including a selection of a particular neural network and/or a particular training technique) to the server(s) 104. Thus, the adversarially-robust neural-network training system 102 on the server(s) 104 can receive information for user input to use in training a neural network.

As shown, the client device 108 includes a client application 110. In particular, the client application 110 may be a web application, a native application installed on the client device 108 (e.g., a mobile application, a desktop application, etc.), or a cloud-based application where part of the functionality is performed by the server(s) 104. The client application 110 can present or display information to a user (e.g., an administrator), including a user interface for managing and selecting neural networks for training and implementation purposes. A user can interact with the client application 110 to provide user input to, for example, train a neural network to classify a digital image or analyze a body of text.

As illustrated in FIG. 1, the environment includes the server(s) 104. The server(s) 104 may generate, store, process, receive, and transmit electronic data, such as digital images, digital text, or digital content campaign parameters. For example, the server(s) 104 may receive data from the client device 108 in the form of a request to train a neural network. In addition, the server(s) 104 can transmit data to the client device 108 to provide a trained neural network. Furthermore, the server(s) 104 can include one or more neural networks such as a security neural network, a natural language processing neural network, or a computer vision neural network. The server(s) 104 can communicate with the client device 108 to transmit and/or receive data via the network 112. In some embodiments, the server(s) 104 comprises a content server. The server(s) 104 can also comprise an application server, a communication server, a web-hosting server, a social networking server, a digital content campaign server, or a digital content management server.

As shown in FIG. 1, the server(s) 104 can also include the adversarially-robust neural-network training system 102 as part of a digital content management system 106. The digital content management system 106 can communicate with the client device 108 to generate, modify, and transmit digital content, such as a digital image or a neural network for analyzing or modifying a digital image. Additionally, the digital content management system 106 can transmit other digital content such as digital content campaign parameters, security information, digital text, etc.

Although FIG. 1 depicts the adversarially-robust neural-network training system 102 located on the server(s) 104, in some embodiments, the adversarially-robust neural-network training system 102 may be implemented by (e.g., located entirely or in part) on one or more other components of the environment. For example, the adversarially-robust neural-network training system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the adversarially-robust neural-network training system 102, bypassing the network 112. Additionally, the adversarially-robust neural-network training system 102 can include one or more databases (e.g., a digital image database or a training database) housed on the server(s) 104 or elsewhere in the environment. The adversarially-robust neural-network training system 102 can be implemented in a variety of different ways across the server(s) 104, the network 112, and the client device 108. Additional detail regarding implementing different components of the adversarially-robust neural-network training system 102 across devices is provided below.

Figure 2:
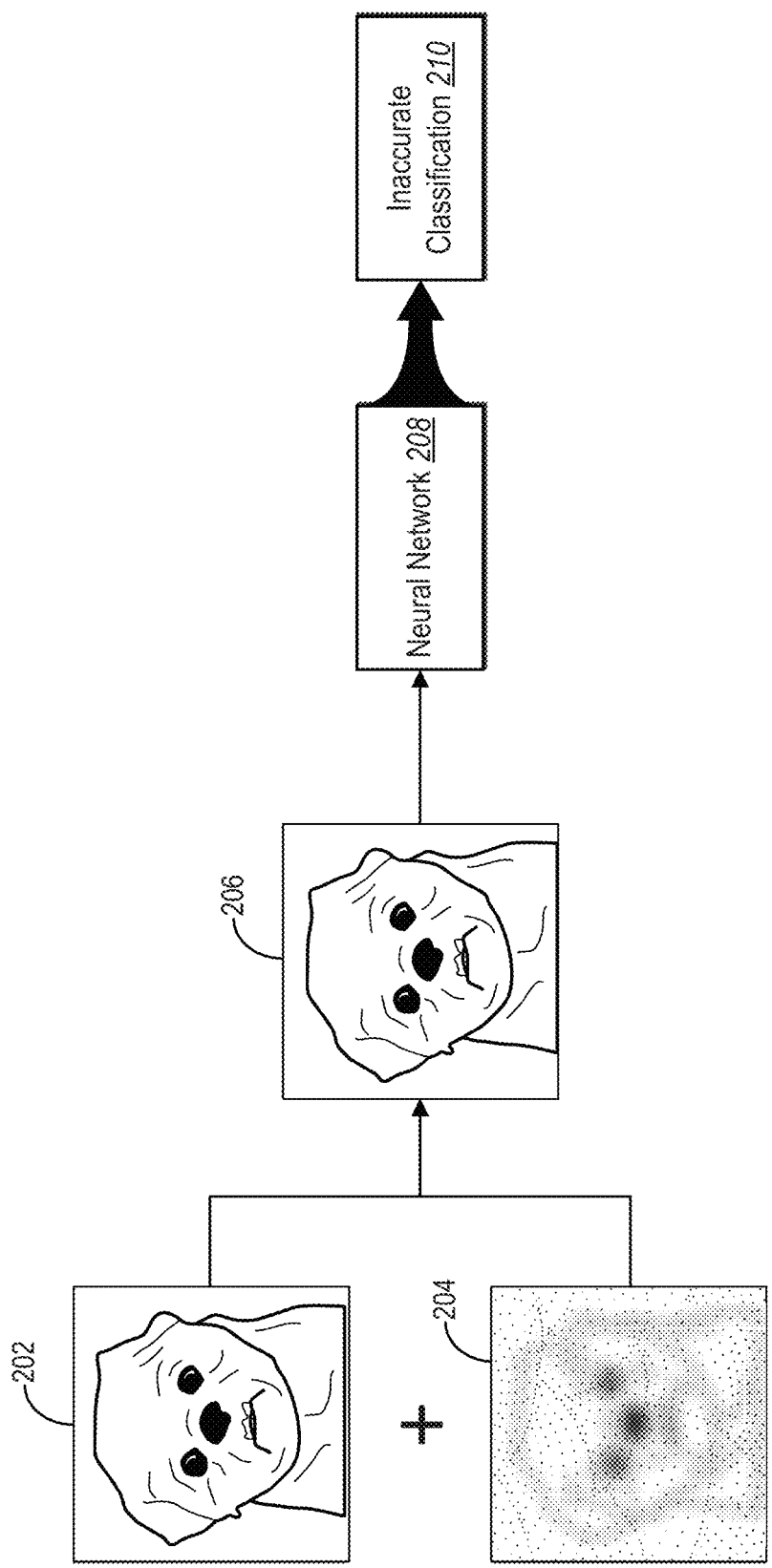
FIG. 2 illustrates results of a neural network trained using prior art methods in accordance with one or more embodiments.

As mentioned above, many conventional neural network systems are highly susceptible to adversarial attacks. FIG. 2 illustrates an example adversarial attack and the inaccuracy of conventional neural network systems as a result of the adversarial attack. Thereafter, the remaining figures relate to the various advantages of the adversarially-robust neural-network training system in improving robustness of neural networks against adversarial attacks.

As illustrated in FIG. 2, a conventional neural network 208 generates an inaccurate classification 210 when the neural network 208 is exposed to an adversarial attack. The adversarial attack in FIG. 2 includes a digital image 202 of a dog in addition to noise input 204 (sometimes referred to as a "perturbation") that are combined to form the adversarial image 206. As shown, the adversarial image 206 includes the digital image 202 and the noise input 204—i.e., the adversarial image 206 is an amalgamation of the two.

The neural network 208 processes the adversarial image 206 as an input, whereupon the neural network 208 generates the inaccurate classification 210. In some embodiments, instead of classifying the adversarial image 206 as a dog, the neural network 208 classifies the adversarial image 206 as an ostrich or some other incorrect object. Indeed, to a human observer, the adversarial image 206 clearly portrays a dog. However, due to the nature of the adversarial input 206 including the noise input 204, the neural network 208 that is trained by a conventional neural network system is incapable of correctly classifying the adversarial image 206 as a dog.

In some cases, the adversarial input 206 is generated by a particular adversarial attack method. For example, the adversarial input 206 can be generated by a fast gradient sign method ("FGSM"), a random FGSM method, a DeepFool method, or a projected gradient descent method. To illustrate, the FGSM method involves generating an adversarial input based on:

$$x^{adv} = x + \in \text{sign}(\nabla_x J(\theta, x, y))$$

where $x^{adv}$ is the adversarial input based on original input x and $\in$ is the variable reflecting the magnitude of perturbation that is introduced while constructing the adversarial input.

In addition, the random FGSM method is a modification of the FGSM method that involves applies the FGSM on a particular data point obtained by adding a small random perturbation (e.g., sampled from a normal distribution) to the original data point. For example, the random FGSM method can be given by:

$$x' = x + \alpha \text{ sign}(\mathcal{N}(0^d, I^d)) \text{ and}$$

$$x^{adv} = x + (\in - \alpha)\text{sign}(\nabla_x J(\theta, x', y))$$

where $x^{adv}$ is the adversarial input based on original input x, $\in$ is the variable reflecting the magnitude of perturbation that is introduced while constructing the adversarial input, and a is the step seize of adding the small random perturbation.

The DeepFool method of generating adversarial input involves an L2 minimization-based optimization to calculate the perturbation which is to be added to the original input. For example, the DeepFool method can be given by:

$$\Delta(x, x^{adv}) = \arg\min_z \|z\|_2 \text{ subject to: } g(x^{adv}) \neq g(x) \text{ and}$$

$$x^{adv} = x + z$$

where $x^{adv}$ is the adversarial input based on original input x and z is the perturbation which is added to the original input x.

The projected gradient descent method involves an iterative FGSM variant where adversarial inputs are constructed by iteratively applying the FGSM method and projecting the perturbed output to a valid constrained space. The projection is done by finding the point in the feasible region that is closest to the current point. For example, the projected gradient descent method can be given by:

$$x^{i+1} = \text{Proj}_{x+S}(x^i + \alpha \text{ sign}(\nabla_x J(\theta, x^i, y)))$$

where $x^{i+1}$ denotes the adversarial input (e.g., a modified digital image) at iteration number i+1 and S is the set of allowed perturbations for the original input (e.g., data point) x.

While FIG. 2 illustrates an adversarial input 206 for digital image classification, additional or alternative types of adversarial input are also possible. For example, adversarial input can be generated to break neural networks in various domains such as computer vision, natural language processing, security, and speech recognition, among others.

Figure 3:
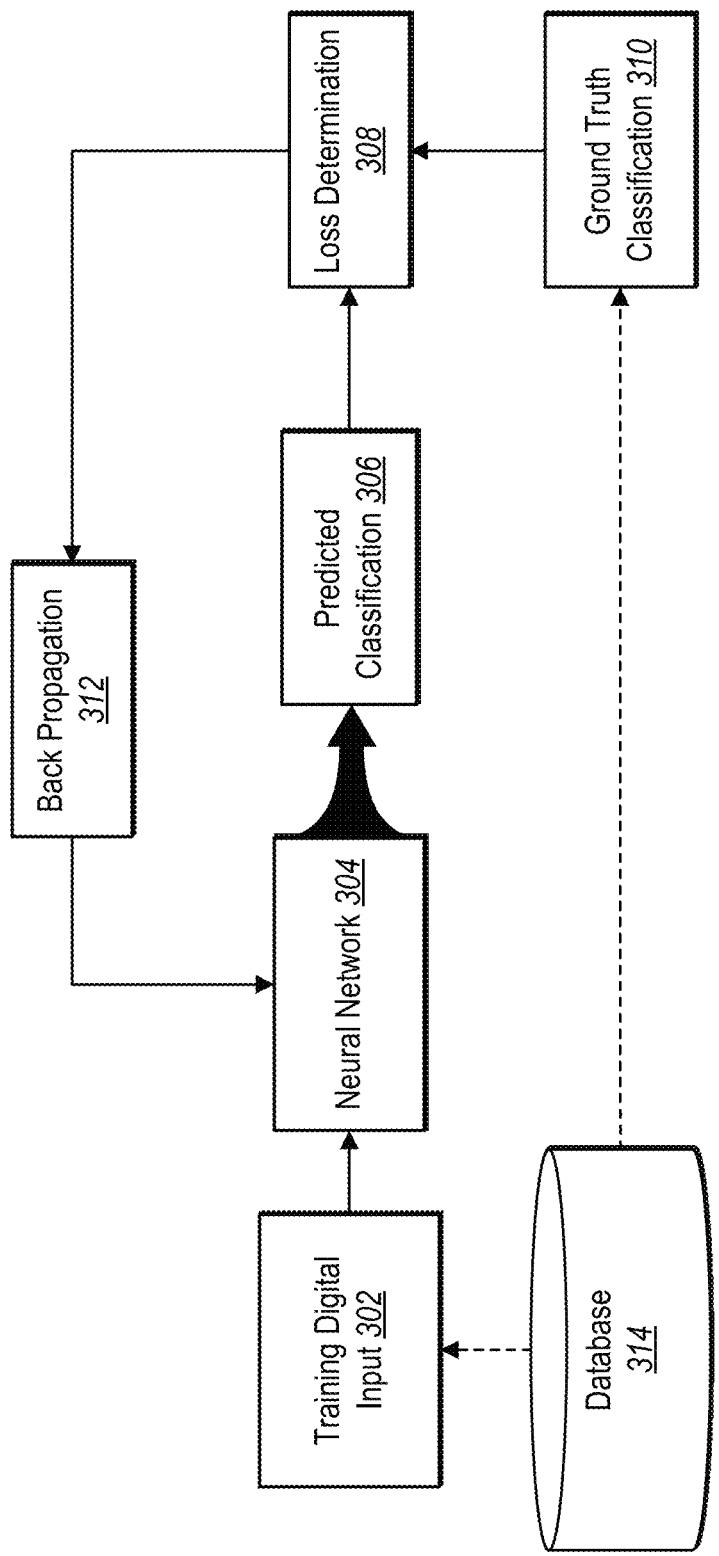
FIG. 3 illustrates an example flowchart of training a neural network in accordance with one or more embodiments.

As mentioned above, the adversarially-robust neural-network training system 102 implements a dynamic dropout routine and/or a cyclic learning rate routine to train neural networks to be more robust against adversarial attacks such as those described in relation to FIG. 2. FIG. 3 illustrates an example process by which the adversarially-robust neural-network training system 102 trains a neural network 304 in accordance with one or more embodiments. Thereafter, FIGS. 4-10B and the corresponding description relate to techniques that the adversarially-robust neural-network training system 102 utilizes to improve the training of the neural network 304 to increase the robustness of the neural network 304 against adversarial attacks.

As illustrated in FIG. 3, the adversarially-robust neural-network training system 102 trains the neural network 304 to generate accurate predictions. Particularly, the adversarially-robust neural-network training system 102 accesses a training digital input 302 within a database 314 to utilize as training data for the neural network 304. For example, the adversarially-robust neural-network training system 102 inputs the training digital input 302 into the neural network 304, whereupon the neural network 304 generates a predicted classification 306. Indeed, the neural network 304 analyzes the training digital input 302 utilizing its various layers, neurons, and weights. Based on the analysis of the training digital input 302, the neural network 304 generates a predicted classification 306 of the training digital input 302.

In addition, the adversarially-robust neural-network training system 102 accesses a ground truth classification 310 from the database 314 that corresponds to the training digital input 302. More specifically, the adversarially-robust neural-network training system 102 identifies a classification that is the actual or ground truth classification of the training digital input 302. Indeed, the adversarially-robust neural-network training system 102 stores, within the database 314, training data that includes training digital images and corresponding ground truth classifications or classification labels.

Based on the identifying the ground truth classification 310, the adversarially-robust neural-network training system 102 further generates a loss determination 308. More particularly, the adversarially-robust neural-network training system 102 compares the predicted classification 306 generated by the neural network 304 with the ground truth classification 310 associated with the training digital input 302. For example, to compare the predicted classification 306 with the ground truth classification 310, the adversarially-robust neural-network training system 102 utilizes a loss function such as a cross entropy loss function, a mean square error loss function, a Kullback-Liebler loss function, a softmax function, or some other appropriate loss function. Thus, the adversarially-robust neural-network training system 102 determines an error or measure of loss associated with the neural network 304. By generating the loss determination 308, the adversarially-robust neural-network training system 102 determines an accuracy of the neural network 304 as well as a degree to which the neural network 304 needs to be adjusted to improve the accuracy.

As further illustrated in FIG. 3, the adversarially-robust neural-network training system 102 further implements back propagation 312. In particular, based on the determined error or measure of loss associated with the neural network 304, the adversarially-robust neural-network training system 102 performs one or more modifications to reduce or minimizes the error or measure of loss. For example, the adversarially-robust neural-network training system 102 modifies weights associated with various neurons within layers of the neural network 304 to adjust internal neuron-specific outputs and thereby affect the final generated output associated with the neural network 304.

Upon modifying weights associated with the neural network 304, the adversarially-robust neural-network training system 102 identifies another training digital input and its corresponding ground truth classification from the database 314 to input into the neural network 304. The neural network 304, in turn, generates another predicted classification. In addition, the adversarially-robust neural-network training system 102 generates another loss determination to determine to what extent the neural network 304 needs to be adjusted to further increase its accuracy in generating predicted classifications. Further, the adversarially-robust neural-network training system 102 implements another back propagation cycle to modify weights of the neural network 304 to yet further reduce the error associated with the neural network 304. By repeating the process illustrated in FIG. 3 in this way (e.g., for several or many iterations or epochs), the adversarially-robust neural-network training system 102 improves the accuracy of the neural network 304 until the neural network 304 generates predicted classifications that are within a threshold similarity of ground truth classifications—or until the error associated with neural network 304 is below a particular error threshold.

Figure 4:
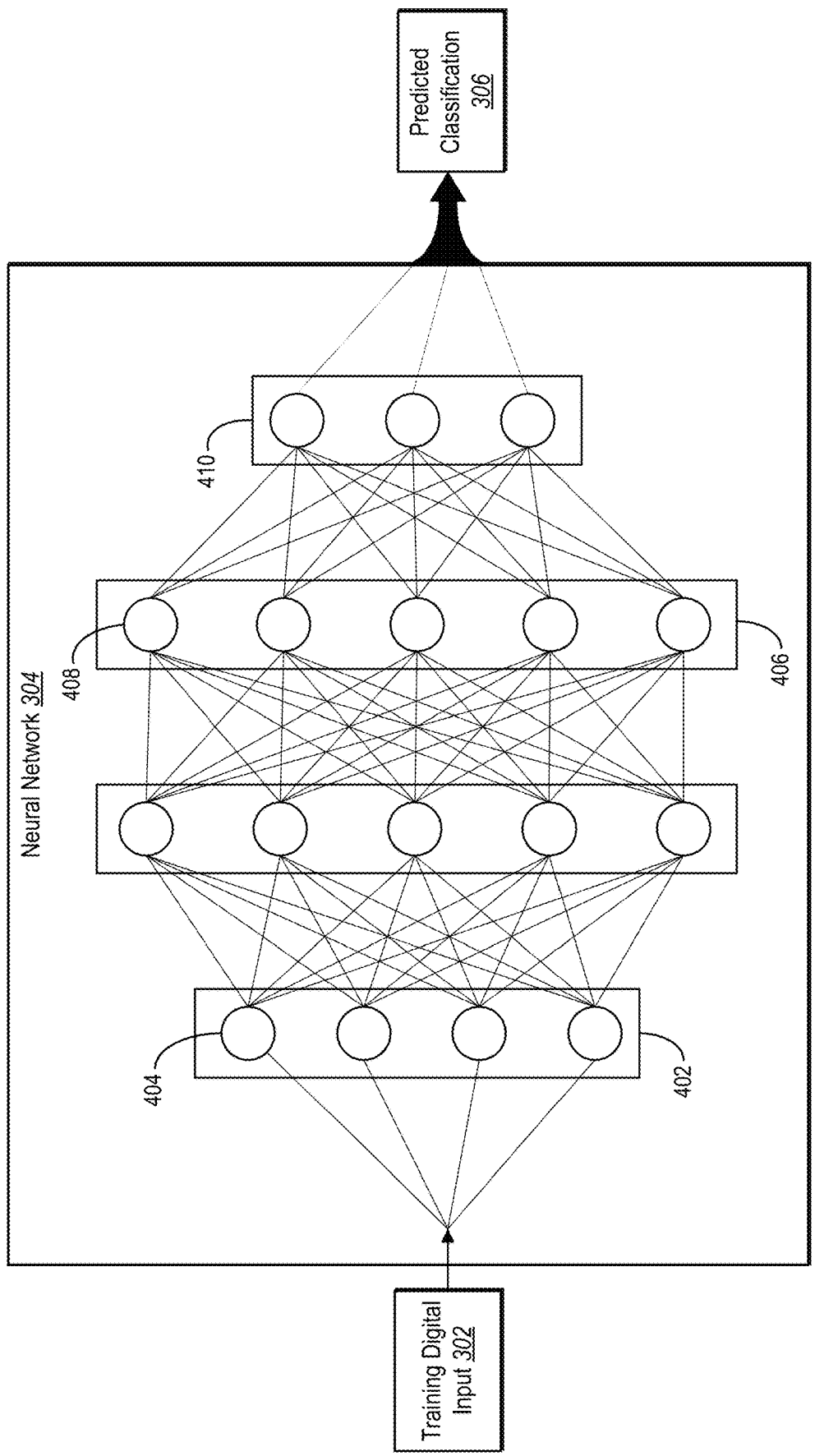
FIG. 4 illustrates an example architecture of a neural network in accordance with one or more embodiments.
Figure 5:
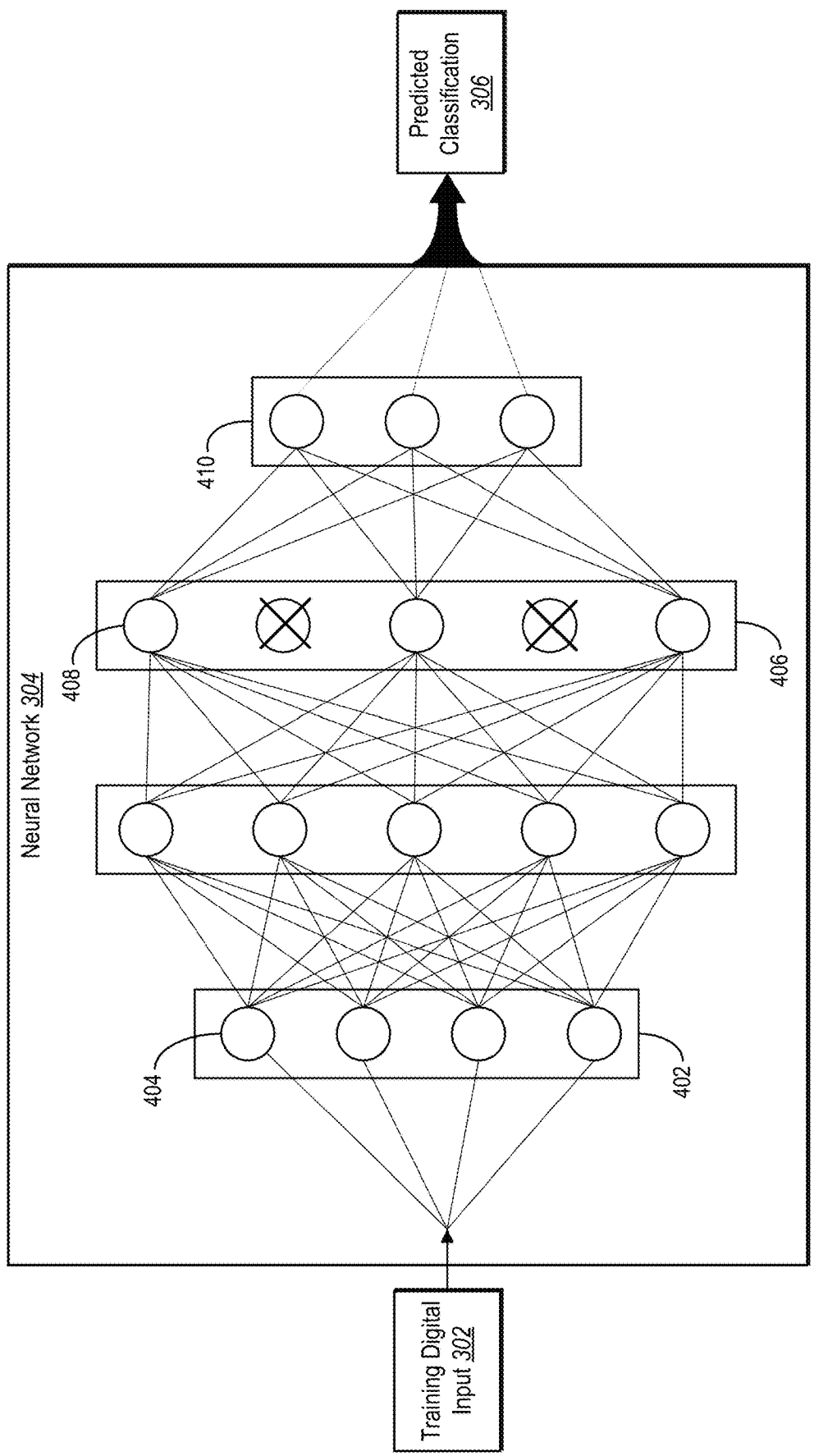
FIG. 5 illustrates the example architecture of FIG. 4 illustrating the use of a dynamic dropout routine during training in accordance with one or more embodiments.

While FIG. 3 illustrates training a particular example neural network 304 that classifies digital input, the adversarially-robust neural-network training system 102 can train additional or alternative neural networks. Likewise, FIGS. 4 and 5 illustrate particular details of the neural network 304 that classifies digital input. However, the adversarially-robust neural-network training system 102 can train neural networks to generate predictions in relation to various domains such as computer vision, natural language processing, security, and speech recognition, among others.

As mentioned, the neural network 304 can include various layers and neurons. FIG. 4 illustrates an example architecture of the neural network 304 in accordance with one or more embodiments. As shown, the neural network 304 includes various layers represented by the long vertical rectangles. For example, the neural network 304 includes layers such as an input layer 402, an output layer 410, and two hidden layers therebetween, including a penultimate layer 406. The neural network 304 further includes neurons represented by the circles within the rectangles, including neuron 404 and neuron 408. While FIG. 4 illustrates only four layers, each with a particular number of neurons, this is merely illustrative. Indeed, the neural network 304 can include a large number (e.g., tens or hundreds) of layers, each with a large number (e.g., tens or hundreds) of neurons. The representation of the neural network 304 within FIG. 4 (and FIG. 5) is simplified for discussion purposes.

As illustrated in FIG. 4, the adversarially-robust neural-network training system 102 provides the training digital input 302 to the neural network 304, whereupon the neural network 304 analyzes the training digital input 302 to generate the predicted classification 306. More specifically, the various neurons of the neural network 304 receive inputs (e.g., from neurons in other layers or directly from the training digital input 302) in a relative fashion. In addition, the neurons generate, based on their respective weights, relative outputs that are propagated to other neurons (e.g., within adjacent layers) or that are compiled to generate the predicted classification 306 (e.g., by the neurons of the output layer 410).

As mentioned, to improve the robustness of the neural network 304, the adversarially-robust neural-network training system 102 implements a dynamic dropout routine during training. FIG. 5 illustrates an example modified version of the neural network 304 as a result of the adversarially-robust neural-network training system 102 implementing a dynamic dropout routine during a training cycle. For instance, FIG. 5 illustrates that the adversarially-robust neural-network training system 102 intelligently drops various neurons out of one or more layers of the neural network 304 (e.g., the penultimate layer 406), as indicated by the crossed-out circles for a given training cycle. As shown, the adversarially-robust neural-network training system 102 implements a dropout routine to intelligently drop various neurons that are redundant or that learn features too similar to features learned by other neurons. During back propagation during the training cycle, the weights of the dropped out neurons will not be updated/modified, which forces the neurons to learn different features. This processes of intelligently selecting and dropping out neurons is repeated during each training cycle. Thus, in a first training cycle a first set of neurons can be dropped out, while in a second training cycle, a second different set of neurons can be dropped out.

Figure 6:
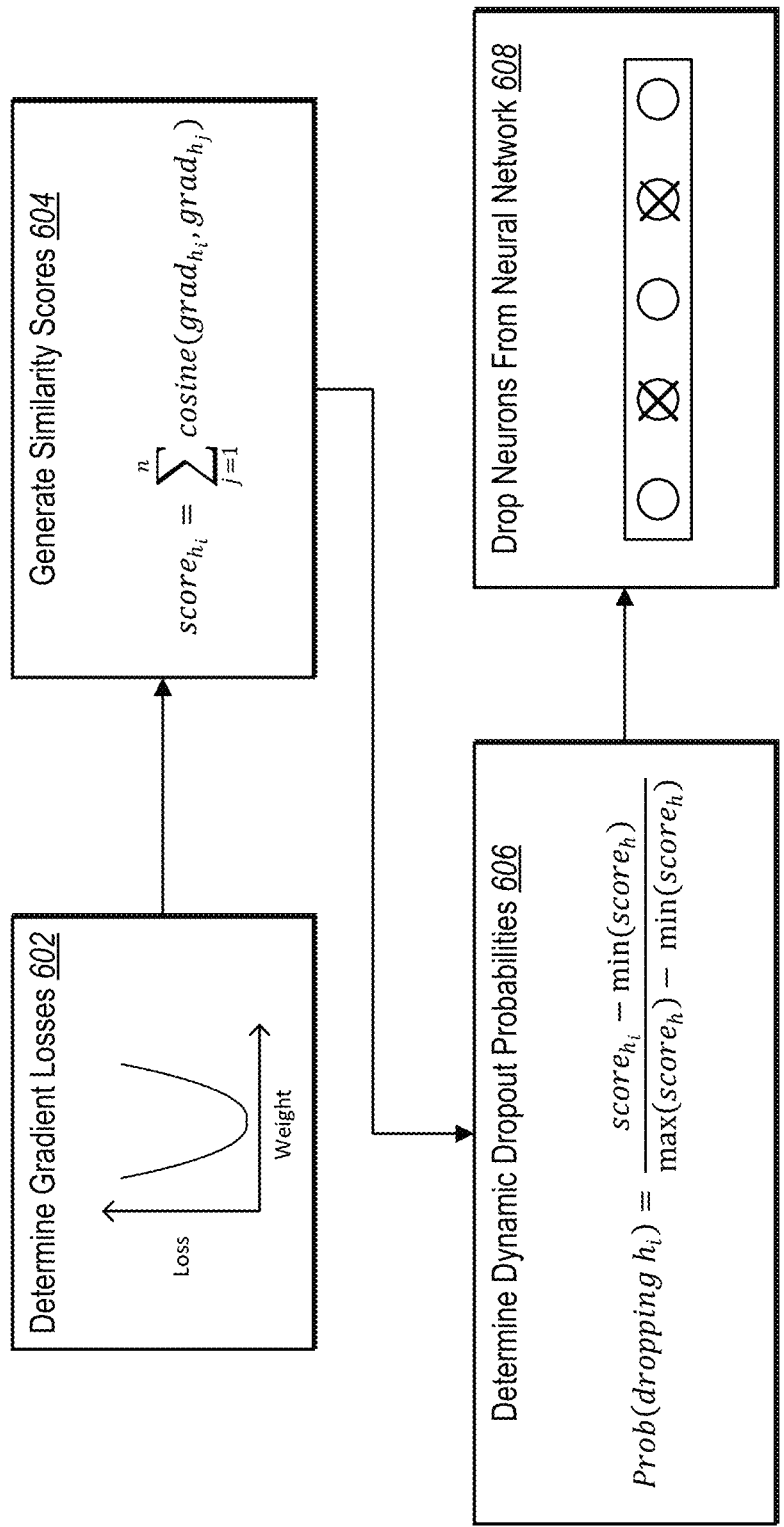
FIG. 6 illustrates an overview of an example process of implementing a dynamic dropout routine in accordance with one or more embodiments.

To determine which neurons to drop from the neural network 304, the adversarially-robust neural-network training system 102 implements a dynamic dropout routine as illustrated in FIG. 6. In particular, the adversarially-robust neural-network training system 102 performs an act 602 to determine gradient losses. More specifically, the adversarially-robust neural-network training system 102 determines gradient losses for a plurality of classification labels with respect to activations of individual neurons (e.g., neurons within the penultimate layer 406). Indeed, the adversarially-robust neural-network training system 102 can generate gradient losses according to a gradient loss function.

For example, given k classes (e.g., different classification labels) where $class_1$ represents the $i^{th}$ class, the adversarially-robust neural-network training system 102 generates gradient losses by first determining losses $L_j$ associated with the classification labels if the true output label was $class_j$, as given by:

$$L_j = J(\theta, x, class_j)$$

where $\theta$ denotes parameters of the neural network 304, x represents the input to the neural network 304 from the domain $[0, 1]^d$, y represents the true output label for input x and $J(\theta, x, y)$ is the cost function.

Based on the losses associated with the classification labels, the adversarially-robust neural-network training system 102 generates gradients of those losses with respect to activations of neurons within a particular layer—e.g., the penultimate layer 406. For example, the adversarially-robust neural-network training system 102 generates gradient losses according to:

$$grad_{h_i}[i] = \frac{\partial L_j}{\partial h_i}$$

where $grad_{h_i}$ is a k-sized vector and h represents the penultimate layer 406 having n neurons. Thus, the adversarially-robust neural-network training system 102 generates k gradients for each of the n neurons.

As further illustrated in FIG. 6, the adversarially-robust neural-network training system 102 performs an act 604 to generate similarity scores. More particularly, the adversarially-robust neural-network training system 102 determines a cosine similarity between each pair of neurons (e.g., each pair of neurons within the penultimate layer 406) and generates a similarity score for a particular neuron (e.g., neuron 408) by adding the cosine values of the neuron with those of all other neurons (e.g., all other neurons within the same layer). For instance, the adversarially-robust neural-network training system 102 generates a similarity score according to:

$$score_{h_i} = \sum_{j=1}^{n} \text{cosine}(grad_{h_i}, grad_{h_j})$$

where $score_{h_i}$ is a similarity score that represents to what extent the $i^{th}$ neuron of the penultimate layer h (the penultimate layer 406) is similar to other neurons within the penultimate layer 406. Thus, when the adversarially-robust neural-network training system 102 generates a higher similarity score for a particular neuron (e.g., the neuron 408), the adversarially-robust neural-network training system 102 determines a higher probability that the neuron is learning features similar to features learned by another neuron—the neuron 408 is learning redundant features.

As further shown in FIG. 6, the adversarially-robust neural-network training system 102 performs an act 606 to determine dynamic dropout probabilities associated with neurons within the neural network 304 (e.g., neurons within the penultimate layer 406). In particular, the adversarially-robust neural-network training system 102 determines that the probability of dropping a particular neuron (e.g., the neuron 408) from the neural network 304 is proportional to its similarity score. For example, the adversarially-robust neural-network training system 102 determines a relationship between a dropout probability and a similarity score given by:

$$\text{Prob(dropping } h_i) \propto score_{h_i}$$

where $score_{h_i}$ is the similarity score associated with the neuron $h_i$ (i.e., the $i^{th}$ neuron within the penultimate layer h).

In addition to determining the relationship between dropout probabilities and similarity scores, the adversarially-robust neural-network training system 102 further determines dynamic dropout probabilities in the form a dynamic dropout probability distribution according to:

$$\text{Prob(dropping } h_i) = \frac{score_{h_i} - \min(score_h)}{\max(score_h) - \min(score_h)}$$

where Prob(dropping $h_i$) represents the probability of dropping out the neuron i within the penultimate layer h (the penultimate layer 406) while training the neural network 304.

Thus, based on the dropout probability distribution, the adversarially-robust neural-network training system 102 performs an act 608 to drop neurons from the neural network 304 for the given training iteration. More specifically, the adversarially-robust neural-network training system 102 probabilistically selects and drops neurons from the neural network 304 based on the dropout probability distribution. For example, the adversarially-robust neural-network training system 102 drops neurons from the penultimate layer 406 (as illustrated in FIG. 5) to prevent multiple neurons from learning features that are too similar to features learned by other neurons.

As mentioned above, the adversarially-robust neural-network training system 102 performs the acts 602-608 for each training cycle. Thus, different neurons can be selected and dropped in different training cycles based on the dropout probability distribution generated for the given training cycle. More specifically, in one training iteration the neurons in the neural network can have a first set of weights. The adversarially-robust neural-network training system 102 can generate a first dropout probability distribution based on losses from predictions generated by the neural network using the first set of weights. Using the first dropout probability distribution, the adversarially-robust neural-network training system 102 can probabilistically select a first set of neurons to drop. During back propagation, the adversarially-robust neural-network training system 102 can avoid updating the weights of the selected first set of neurons while modifying the rest weights of the rest of the neurons based on the determined losses. Thus, after this first training iteration, the neural network can have a second set of weights comprising the updated weights for the non-dropped neurons and the same weights for the dropped neurons.

In a second training iteration, the second set of weights can be used. One will appreciate that the sets of training data can be different for the first and second training iterations. During the second training iteration, the adversarially-robust neural-network training system 102 can generate a second dropout probability distribution based on losses from predictions generated by the neural network using the second set of weights. Using the second dropout probability distribution, the adversarially-robust neural-network training system 102 can probabilistically select a second set of neurons to drop. The second set of neurons can be the same, different, or comprising one or more of the same neurons as the first set of neurons to drop. During back propagation, the adversarially-robust neural-network training system 102 can avoid updating the weights of the selected second set of neurons while modifying the rest weights of the rest of the neurons based on the determined losses. The adversarially-robust neural-network training system 102 can repeat this process until the neural network converges or another stopping condition is met (e.g., the determined losses are within a predetermined threshold or a given number of epochs is performed).

The acts 602-608 can also be implemented as part of an algorithm for determining a dropout routine based on a dynamic dropout probability distribution. Indeed, the below algorithm 1 illustrates an example algorithm for determining a dynamic dropout probability distribution for a given training iteration.

---

Algorithm 1 Generating a dynamic dropout probability distribution

1: Input: Neural network with parameters θ, input x, ground truth label class$_i$, penultimate layer h having n neurons, k classes
2: Output: Probabilities of dropping neurons
3: for i ← 1, 2, . . . , k do
4:    $L_i$ ← J(θ, x, class$_i$)
5: end for
6: for i ← 1, 2, . . . , n do
7:    for j ← 1, 2, . . . , k do
8:       $(grad_{h_i})_j \leftarrow \nabla_{h_i} L_j$
9:    end for
10: end for
11: for i ← 1, 2, . . . , n do

---

Algorithm 1 Generating a dynamic dropout probability distribution

12:    $score_{h_i} \leftarrow \Sigma_{j=1}^{n}$ cosine $(grad_{h_i}, grad_{h_j})$
13: end for
14: for i ← 1, 2, . . . , n do
15:    $P(dropping\ h_i) \leftarrow \dfrac{score_{h_i} - min(score_h)}{max(score_h) - min(score_h)}$
16: end for
17: return P

---

Based on algorithm 1, the adversarially-robust neural-network training system 102 utilizes an input (as indicated by line 1 above) of a neural network with parameters θ, input x, ground truth label class$_i$, and penultimate layer h having n neurons and k classes to generate an output (as indicated by line 2) of probabilities of dropping neurons within a neural network. To generate the output, the adversarially-robust neural-network training system 102 determines losses $L_i$ associated with classification labels class$_i$ for k classes, as shown by lines 3-5 above. Indeed, the adversarially-robust neural-network training system 102 determines losses associated with each of the k classes.

In addition, the adversarially-robust neural-network training system 102 determines, for the plurality of classification labels class$_i$, k gradient losses $grad_{h_i}$ associated with one or more neurons of a neural network, as indicated by lines 6-10 above. For example, the adversarially-robust neural-network training system 102 generates a list of gradients for the purpose of generating a similarity index. To that end, as indicated by lines 11-13, the adversarially-robust neural-network training system 102 generates, based on the gradient losses $grad_{h_i}$, n similarity scores $score_{h_i}$ between pairs of neurons. Indeed, for each of the neurons in the layer i, the adversarially-robust neural-network training system 102 determines a similarity score. For example, the adversarially-robust neural-network training system 102 determines a similarity score, for a given neuron within a given layer, by determining cosine similarities between the given neuron and every other neuron in the layer, and summing the cosine similarities together. In some embodiments, a higher score indicates a higher probability of dropping the corresponding neuron.

In addition, the adversarially neural network training system 102 determines a dynamic dropout probability distribution $P(dropping\ h_i)$ (for i=1 to n) associated with one or more neurons in the layers of the neural network. Indeed, as shown in lines 14-16 above, the adversarially-robust neural-network training system 102 generates a probability distribution (e.g., a multinomial distribution) for all neurons in a particular layer i. To generate the probability distribution, the adversarially-robust neural-network training system 102 determines a probability of dropping each neuron in the layer i. For example, the adversarially-robust neural-network training system 102 divides, for each given similarity score of each neuron within the layer, the difference between the given similarity score and the minimum similarity score (e.g., a minimum of all similarity scores for neurons within the layer) within the layer by the difference between the maximum similarity score (e.g., a maximum of all similarity scores for neurons within the layer) and the minimum similarity score (as shown in line 15). In some embodiments, the probabilities within a distribution for a given layer i sum to 1.

Algorithm 1 or the acts 602-608 can comprise the corresponding structure/acts for a step for implementing a dropout routine based on a dynamic dropout probability distribution associated with one or more neurons of the plurality of layers.

By training the neural network 102 according to the process illustrated in FIG. 6, the adversarially-robust neural-network training system 102 increases the robustness of the neural network 304 against adversarial attacks. Indeed, FIGS. 7A-7B illustrate tables that depict the improvement of the adversarially-robust neural-network training system 102 over conventional systems. As shown in FIGS. 7A and 7B, the adversarially-robust neural-network training system 102 provides greater security against various adversarial attack methods such as the FGSM method, the DeepFool method, and the projected gradient descent ("PGD") method.

For example, FIG. 7A illustrates differences in prediction accuracy (in percentages) over different adversarial attacks on a given neural network (e.g., the neural network 304). As shown, Model A represents the neural network 304 trained by the adversarially-robust neural-network training system 102, while Model N represents a neural network trained by a conventional system. Thus, as illustrated in FIG. 7A, the adversarially-robust neural-network training system 102 improves prediction accuracy when exposed to an FGSM attack—from 5.84% accuracy of a conventional system to an accuracy of 26.3% for the adversarially-robust neural-network training system 102. Similarly, the adversarially-robust neural-network training system 102 improves the accuracy in circumstances associated with DeepFool attacks from 2.34% to 5.59% and, for PGD attacks, from 0% to 10.84%.

Additionally, FIG. 7B illustrates differences in prediction accuracy (in percentages) over different adversarial attacks transferred from a different neural network N' (e.g., a neural network generated from some third-party model using a different initialization and/or a neural network that incorrectly classifies data based on an adversarial attack). Similar to FIG. 7A, Model A in FIG. 7B represents the neural network 304 trained by the adversarially-robust neural-network training system 102, while Model N represents a neural network (e.g., the neural network 208) trained by a conventional system. As shown, the adversarially-robust neural-network training system 102 improves the prediction accuracy of a neural network over different adversarial examples transferred from the model N'. Indeed, the adversarially-robust neural-network training system 102 improves the accuracy under an FGSM attack from 38.4% to 58.58%. Additionally, the adversarially-robust neural-network training system 102 improves the accuracy in response to a DeepFool attack from 96.64% to 97.41%, and the adversarially-robust neural-network training system 102 improves the accuracy under a PGD attack from 20.74% to 59.68%.

Figure 8:
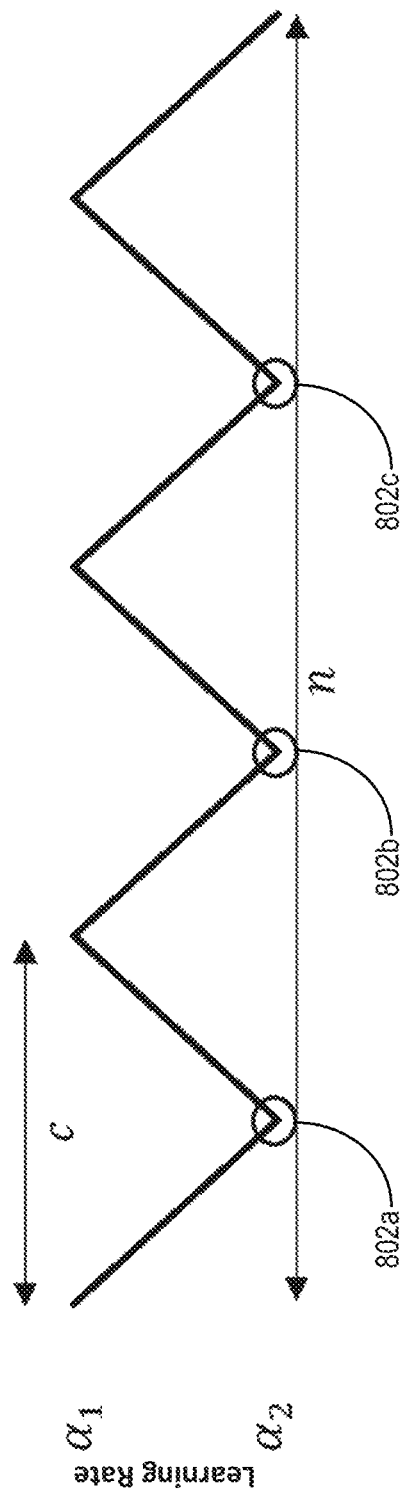
FIG. 8 illustrates an overview of an example cyclic learning rate routine in accordance with one or more embodiments.

As mentioned above, in addition (or alternatively) to utilizing a dynamic dropout routine, the adversarially-robust neural-network training system 102 can further utilize a cyclic learning rate routine to train the neural network 304 to improve its robustness against adversarial attacks. FIG. 8 illustrates an example of a cyclic learning rate that the adversarially-robust neural-network training system 102 implements in one or more embodiments. For example, as shown in FIG. 8, the adversarially-robust neural-network training system 102 samples or extracts weights of the neural network 304 at various sample points 802a-802c. Accordingly, by sampling the weights at different sample points 802a-802c, the adversarially-robust neural-network training system 102 effectively generates a plurality of neural networks, each with different weights (and, as a result, different decision boundaries) associated with the learning rates of each sample point 802a-802c.

To elaborate, as illustrated in FIG. 8, the adversarially-robust neural-network training system 102 oscillates the learning rate associated with the neural network 304 between a first learning rate $\alpha_1$ and a second learning rate $\alpha_2$. Indeed, for a given period c, the adversarially-robust neural-network training system 102 oscillates the learning rate from the first learning rate $\alpha_1$ to the second learning rate $\alpha_2$ and back to the first learning rate $\alpha_1$. In one or more embodiments, the first learning rate $\alpha_1$ is a threshold amount different than the second learning rate $\alpha_2$. For example, the first learning rate $\alpha_1$ can be at least 1.25, 1.5, 1.75, or 2 times the second learning rate $\alpha_2$. In addition, by sampling the weights of the neural network 304 at sample point 802a, 802b, and 802c (e.g., midpoints), the adversarially-robust neural-network training system 102 effectively generates three separate neural networks, each with different weights. Although not illustrated, in some embodiments the adversarially-robust neural-network training system 102 generates more or fewer neural networks by sampling weights at more or fewer sample points.

Figure 9:
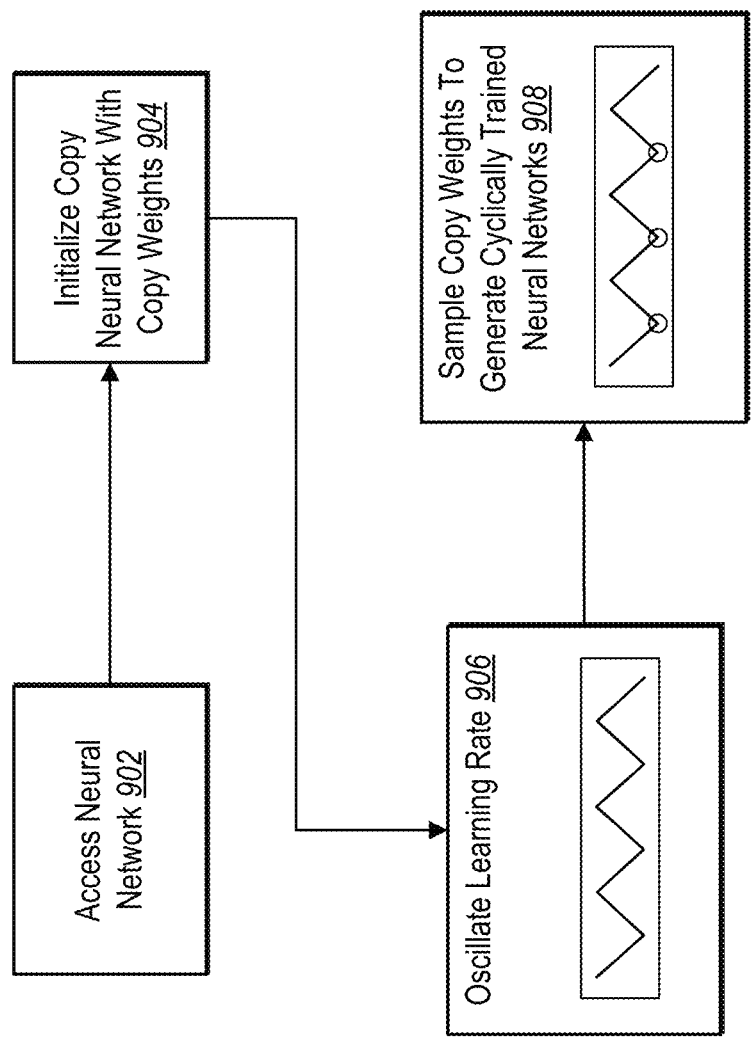
FIG. 9 illustrates an example process of implementing a cyclic learning rate routine in accordance with one or more embodiments.

To implement the cyclic learning rate routine illustrated in FIG. 8, the adversarially-robust neural-network training system 102 performs various acts to ensure that the decision boundaries associated with the neural networks are distinct. Indeed, FIG. 9 illustrates an example flow of various acts 902-908 involved in the cyclic learning rate routine. As shown, the adversarially-robust neural-network training system 102 performs an act 902 to access a neural network (e.g., the neural network 304) to utilize as a basis for the cyclic learning rate routine.

Additionally, the adversarially-robust neural-network training system 102 performs an act 904 to initialize a copy of the neural network 304 with copy weights set equal to the weights of the neural network 304. For example, the adversarially-robust neural-network training system 102 generates a copy of the neural network 304 and sets the weights associated with neurons of the copy neural network to be the same as the weights of the neurons within the neural network 304.

As further illustrated in FIG. 9, the adversarially-robust neural-network training system 102 performs an act 906 to oscillate the learning rate associated with the copy neural network. More specifically, the adversarially-robust neural-network training system 102 forces the weights of the copy neural network away from the weights of the neural network 304 (without decreasing prediction accuracy) by adopting a cyclic learning rate routine with a learning rate at iteration i given the following learning rate function:

$$\alpha(i) = \begin{cases} (1 - 2t(i))\alpha_1 + 2t(i)\alpha_2 & 0 < t(i) \leq \frac{1}{2} \\ (2t(i) - 1)\alpha_1 + (2 - 2t(i))\alpha_2 & \frac{1}{2} < t(i) \leq 1 \end{cases}$$

where $$t(i) = \frac{1}{c}(\mod(i - 1, \ c) + 1), \alpha_1 > \alpha_2$$

are the learning rates, and c is the cycle length (i.e., the number of iterations in a cycle).

As a result of cycling the learning rate according to the learning rate function between the first learning rate $\alpha_1$ and the second learning rate $\alpha_2$, the adversarially-robust neural-network training system 102 implements an exploration-exploitation cycle. For instance, in periods where the learning rate is large, the copy neural network explores a weight space doing large steps (exploration), while in periods where the learning is small, the copy neural network recovers its prediction accuracy with smaller steps (exploitation).

As further illustrated in FIG. 9, the adversarially-robust neural-network training system 102 performs an act 908 to sample copy weights to generate cyclically trained neural networks. More particularly, the adversarially-robust neural-network training system 102 generates cyclic weights by collecting the weights at the sample points 802a-802c (e.g., at midpoints) of the illustrated cycles (e.g., where the learning rate oscillates to the second learning rate $\alpha_2$). In some embodiments, however, the adversarially-robust neural-network training system 102 samples the weights at different sample points other than cycle midpoints. As a result of sampling the weights during the cycles of changing the learning rates, the adversarially-robust neural-network training system 102 generates a plurality of cyclically trained neural networks associated with the weights at the sample points 802a-802c, where the weights at each sample point correspond to a neural network with a different decisions boundaries.

The acts 902-908 can also be implemented as part of an algorithm for generating a set of cyclically trained models. Indeed, algorithm 2 illustrates an example algorithm for generating a set of cyclically trained models.

---

Algorithm 2 Cyclic Learning Rate Routine

1:     Input: weights $\tilde{w}$, learning rate (LR) bounds $\alpha_1$, $\alpha_2$, cycle length c, number of iterations n
2:     Output: Set of cyclically trained models (weights)
3:     w ← $\tilde{w}$
4:     cyclic$_{weights}$ ← [ ]
5:     for i ← 1, 2, ..., n do
6:        α ← α(i)
7:        w ← α∇$_w$J(w)
8:        if mod(i, c) = $\frac{c}{2}$ then
9:           cyclic$_{weights}$ ← cyclic$_{weights}$ + [w]
10:       end if
11:    end for
12:    return cyclic$_{weights}$

---

As shown by Algorithm 2, the adversarially robust neural network training system 102 utilizes an input (as indicated by line 1) including weights $\tilde{w}$, learning rate bounds $\alpha_1$ and $\alpha_2$, a cycle length c, and a number of iterations n to generate an output (as indicated by line 2) of a set of cyclically trained models (weights). In particular, the adversarially robust neural network training system 102 averages a prediction by generating outputs for n neural networks and averaging the outputs. To illustrate, the adversarially robust neural network training system 102 initializes a copy neural network with copy weights w set equal to the weights $\tilde{w}$ of the neural network, as indicated by line 3 above. In addition, as shown by lines 4-11, the adversarially robust neural network training system 102 also implements a cyclic learning rate routine to force the copy weights away from the weights of the neural network without decreasing prediction accuracy by oscillating, for a plurality of n training iterations over one or more cycles, a learning rate of the copy neural network between a first learning rate $\alpha_1$ and a second learning rate $\alpha_2$. In addition, as indicated by lines 8-10 above, the adversarially robust neural network training system samples the copy weights w at a sampling point of each of the one or more cycles, where the sample point is a midpoint of a cycle. Thus, as indicated by line 12, the adversarially robust neural network training system 102 generates the output set of cyclically trained models cyclic$_{weights}$ based on the sampling indicated by lines 8-10.

By implementing the cyclic learning rate routine, the adversarially-robust neural-network training system 102 improves the robustness of neural networks against adversarial attacks while ensuring that the cyclically-trained neural networks have training accuracies within a tolerance of each other (e.g., within a predication accuracy percentage). Indeed, FIGS. 10A-10B illustrate prediction accuracy improvements (in percentages) of the adversarially-robust neural-network training system 102 with respect to various adversarial attack methods such as FGSM, DeepFool, and PGD. As illustrated in FIGS. 10A and 10B, Model N represents a neural network (e.g., neural network 208) trained by a conventional system, whereas Model A represents a neural network (e.g., the neural network 304 or the above-mentioned copy neural network) trained by the adversarially-robust neural-network training system 102.

As illustrated in FIG. 10A, the adversarially-robust neural-network training system 102 improves the prediction accuracy of a particular neural network. In circumstances where the neural network is exposed to an FGSM attack, the adversarially-robust neural-network training system 102 improves the accuracy from 5.84% to 14.2%. Additionally, the adversarially-robust neural-network training system 102 improves the accuracy of the neural network in response to DeepFool attacks from 2.34% to 81.48%, and for PGD attacks from 0% to 0.1%.

As illustrated in FIG. 10B, the adversarially-robust neural-network training system 102 also improves the prediction accuracy of a neural network over adversarial examples transferred from a model N' (e.g., a model that incorrectly classifies data based on an adversarial attack). Indeed, the adversarially-robust neural-network training system 102 improves the accuracy of the neural network in response to transferred adversarial examples for an FGSM attack from 38.4% to 44.07%. In addition, the adversarially-robust neural-network training system 102 improves accuracy based on the DeepFool method from 96.64% to 97.1%, and based on the PGD method, from 20.74% to 51.65%. From these results, the adversarially-robust neural-network training system 102 outperforms a conventionally trained model over a variety of adversarial attacks.

Further, the adversarially-robust neural-network training system 102 learns decision boundaries different from a conventional model. To elaborate, the adversarially-robust neural-network training system 102 generates decision boundaries over different adversarial attacks that more greatly differ from N' (a neural network that generates incorrect predictions based on an adversarial attack) than do the decision boundaries of a conventionally-trained neural network. As a result of differentiating decision boundaries further from an incorrect neural network, the adversarially-robust neural-network training system 102 improves accuracy over conventional systems because the parameters (e.g., weights) learned by a neural network trained by the adversarially-robust neural-network training system 102 are different from those of a neural network trained by a conventional system.

Further still, the adversarially-robust neural-network training system 102 can utilize the cyclic learning rate routine to improve accuracy of an adversarially-trained neural network. To elaborate, an adversarially-trained neural network refers to a neural network that is trained using adversarial training data such as a digital image with a perturbation (e.g., noise) and a corresponding ground truth classification. Some conventional systems utilize adversarial training to improve security of neural networks against adversarial attacks. Beyond adversarial training, the adversarially-robust neural-network training system 102 still further improves the security of neural networks.

For example, rather than minimizing a determine measure of loss on normal examples (e.g., normal input), the adversarially-robust neural-network training system 102 minimizes the loss on adversarial input generated at each step of the training process. In these adversarial training cases, the adversarially-robust neural-network training system 102 improves the prediction accuracy of an adversarially-trained neural network in response to FGSM methods, DeepFool methods, and PGD methods.

Figure 11:
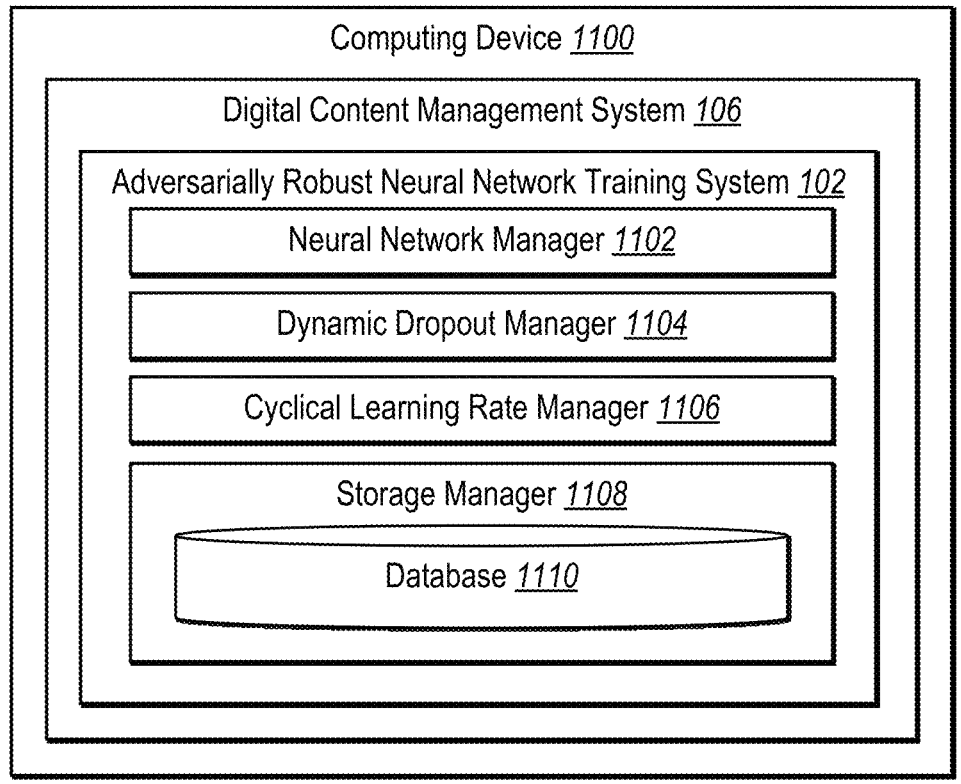
FIG. 11 illustrates a schematic diagram of an adversarially-robust neural-network training system in accordance with one or more embodiments.

Looking now to FIG. 11, additional detail will be provided regarding components and capabilities of the adversarially-robust neural-network training system 102. Specifically, FIG. 11 illustrates an example schematic diagram of the adversarially-robust neural-network training system 102 on an example computing device 1100 (e.g., one or more of the client device 108 and/or the server(s) 104). As shown in FIG. 11, the adversarially-robust neural-network training system 102 may include a neural network manager 1102, a dynamic dropout manager 1104, a cyclic learning rate manager 1106, and a storage manager 1108.

As just mentioned, the adversarially-robust neural-network training system 102 can include a neural network manager 1102. In particular, the neural network manager 1102 can manage, maintain, train, implement, utilize, or communicate with one or more neural networks. For example, the neural network manager 1102 can communicate with the storage manager 1108 to access a neural network (e.g., the neural network 304) stored within the database 1110. In addition, the adversarially-robust neural-network training system 102 can communicate with the dynamic dropout manager 1104 and/or the cyclic learning rate manager 1106 to train and implement a neural network to classify digital images or generate predictions for other possible domains.

Indeed, the dynamic dropout manager 1104 can train and implement a neural network based on dynamic dropout routine, as described above. For example, the dynamic dropout manager 1104 can communicate with the neural network manager 1102 and the storage manager 1108 to access a neural network stored within the database 1110. In addition, the dynamic dropout manager 1104 can determine gradient losses associated with classification labels for a number of neurons within the neural network. Further, the adversarially-robust neural-network training system 102 can generate similarity scores between pairs of neurons, determine a dynamic dropout probability distribution associated with the neurons, and generate a trained neural network based on the probability distribution.

As illustrated, the adversarially-robust neural-network training system 102 further includes a cyclical learning rate manager 1106. The cyclical learning rate manager 1106 can train and/or implement a neural network based on a cyclic learning rate routine, as set forth above. For example, the cyclical learning rate manager 1106 can communicate with the neural network manager 1102 and/or the storage manager 1108 to access a neural network. In addition, the cyclical learning rate manager 1106 can initialize a copy of the neural network with copy weights set equal to the weights of the neural network. The cyclical learning rate manager 1106 can further implement a cyclic learning rate by oscillating a learning rate of the copy neural network between a first learning rate and a second learning rate. Further, the cyclical learning rate manager 1106 can generate one or more cyclically-trained neural networks by sampling, capturing, or extracting weights of the copy neural network at sample points within the oscillation of the learning rate, as described above.

In one or more embodiments, each of the components of the adversarially-robust neural-network training system 102 are in communication with one another using any suitable communication technologies. Additionally, the components of the adversarially-robust neural-network training system 102 can be in communication with one or more other devices including one or more client devices described above. It will be recognized that although the components of the adversarially-robust neural-network training system 102 are shown to be separate in FIG. 11, any of the subcomponents may be combined into fewer components, such as into a single component, or divided into more components as may serve a particular implementation. Furthermore, although the components of FIG. 11 are described in connection with the adversarially-robust neural-network training system 102, at least some of the components for performing operations in conjunction with the adversarially-robust neural-network training system 102 described herein may be implemented on other devices within the environment.

The components of the adversarially-robust neural-network training system 102 can include software, hardware, or both. For example, the components of the adversarially-robust neural-network training system 102 can include one or more instructions stored on a computer-readable storage medium and executable by processors of one or more computing devices (e.g., the computing device 1100). When executed by the one or more processors, the computer-executable instructions of the adversarially-robust neural-network training system 102 can cause the computing device 1100 to perform the methods described herein. Alternatively, the components of the adversarially-robust neural-network training system 102 can comprise hardware, such as a special purpose processing device to perform a certain function or group of functions. Additionally or alternatively, the components of the adversarially-robust neural-network training system 102 can include a combination of computer-executable instructions and hardware.

Furthermore, the components of the adversarially-robust neural-network training system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the adversarially-robust neural-network training system 102 may be implemented as part of a stand-alone application on a personal computing device or a mobile device. Alternatively or additionally, the components of the adversarially-robust neural-network training system 102 may be implemented in any application that allows creation and delivery of marketing content to users, including, but not limited to, applications in ADOBE CREATIVE CLOUD or ADOBE MARKETING CLOUD, such as ADOBE ILLUSTRATOR, ADOBE PHOTOSHOP, ADOBE CAMPAIGN, and ADOBE ANALYTICS. "ADOBE," "ILLUSTRATOR," "PHOTO SHOP," "CAMPAIGN," and "ANALYTICS" are registered trademarks of Adobe Inc. in the United States and/or other countries.

FIGS. 1-11, the corresponding text, and the examples provide a number of different systems, methods, and non-transitory computer readable media for training and generating neural networks with improved robustness against adversarial attacks. In addition to the foregoing, embodiments can also be described in terms of flowcharts comprising acts for accomplishing a particular result. For example, FIGS. 12-13 illustrate a flowchart of example sequences of acts in accordance with one or more embodiments.

Figure 12:
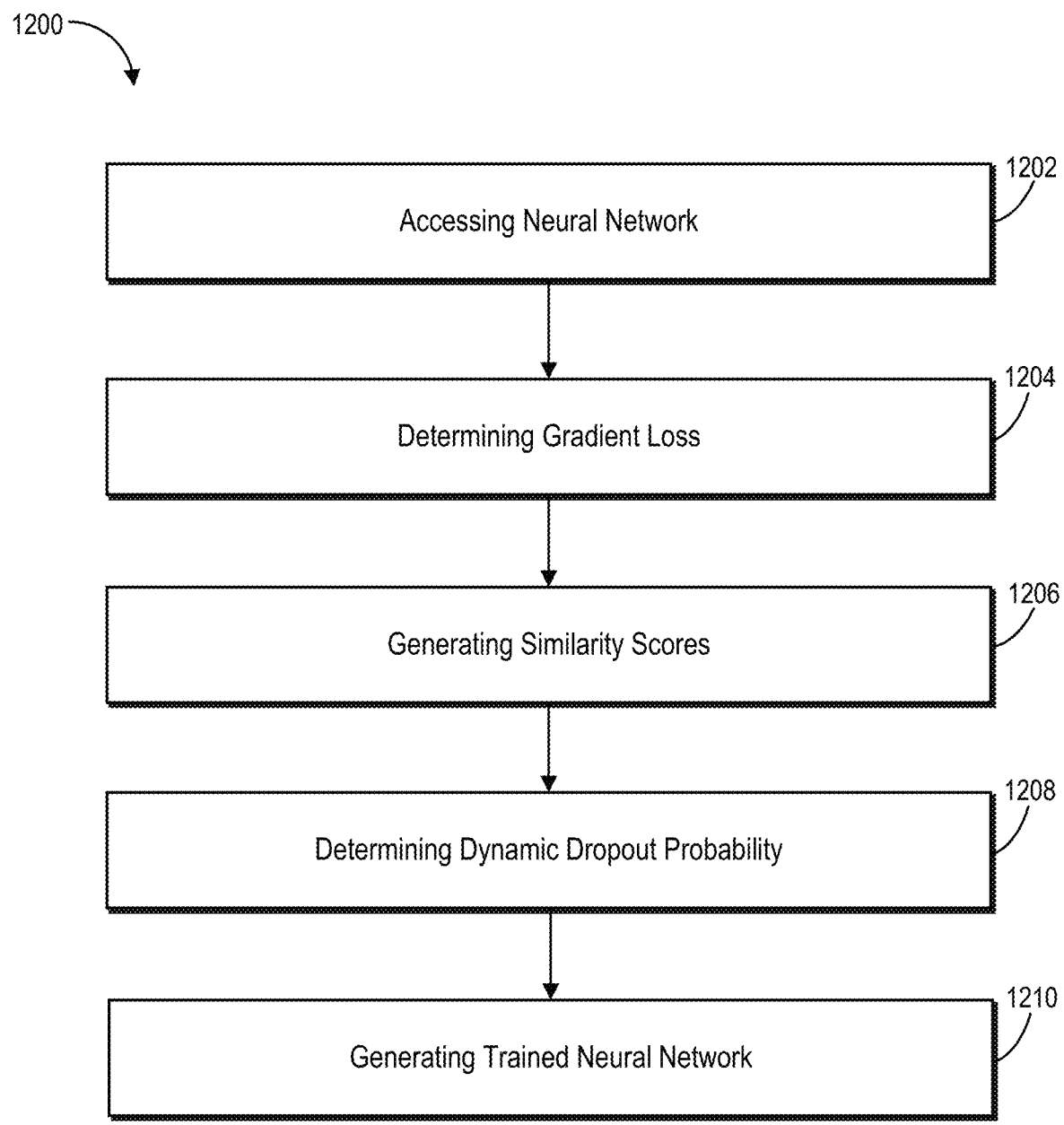
FIG. 12 illustrates a flowchart of a series of acts for generating a trained neural network using a dynamic dropout routine in accordance with one or more embodiments.
Figure 13:
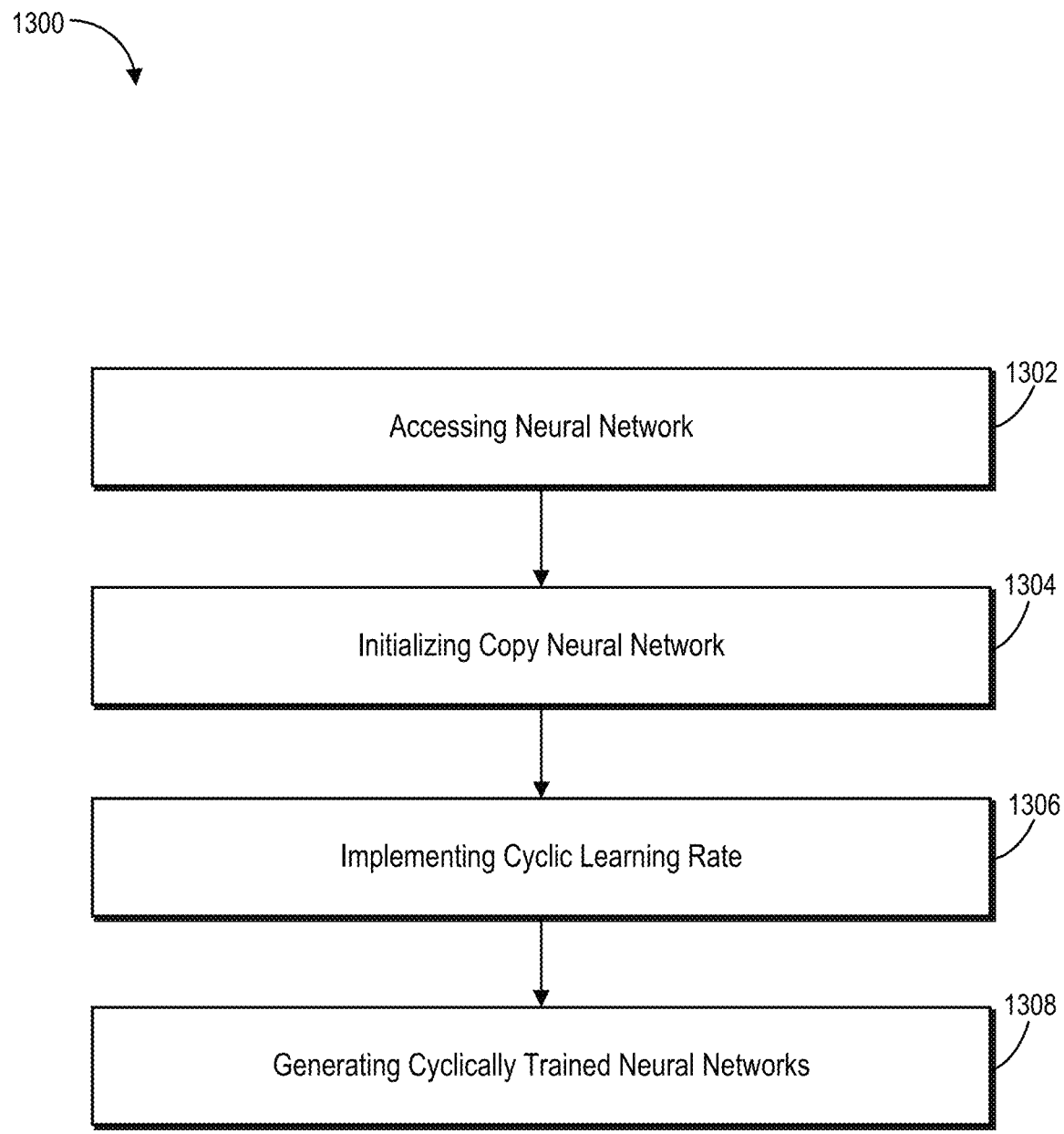
FIG. 13 illustrates a flowchart of a series of acts for generating a trained neural network using a cyclic learning rate routine in accordance with one or more embodiments.

While FIGS. 12-13 illustrate acts according to respective embodiments, alternative embodiments may omit, add to, reorder, and/or modify any of the acts shown in FIGS. 12-13. The acts of FIGS. 12-13 can be performed as part of a method. Alternatively, a non-transitory computer readable medium can comprise instructions, that when executed by one or more processors, cause a computing device to perform the acts of FIGS. 12-13. In still further embodiments, a system can perform the acts of FIGS. 12-13. Additionally, the acts described herein may be repeated or performed in parallel with one another or in parallel with different instances of the same or other similar acts.

FIG. 12 illustrates an example series of acts 1200 of generating a trained neural network based on a dynamic dropout routine. In particular, the series of acts 1200 includes an act 1202 of accessing a neural network. For example, the act 1202 can involve accessing a neural network comprising a plurality of layers, wherein each layer of the plurality of layers comprises one or more neurons. Act 1202 can further involve providing training input from a plurality of training data to the neural network for a training iteration.

As shown, the series of acts 1200 includes an act 1204 of determining a gradient loss. In particular, the act 1204 can involve determining, for a plurality of classification labels, gradient losses associated with neurons of a layer of the neural network based on the training input. The act 1204 can further involve determining gradient losses with respect to activations in a penultimate layer of the neural network. A classification label can include a known label for which the neural network generates, based on input data, a probability that the input data corresponds to the classification label. Act 1204 can further involve determining, for a given neuron, a gradient loss for each of the plurality of possible classifications. Act 1204 can also involve determining losses, using a cost function to compare a predicted output form the neural network with a ground truth, from which the gradient losses are determined.

Additionally, the series of acts 1200 includes an act 1206 of generating similarity scores. In particular, the act 1206 can involve generating, based on the gradient losses, similarity scores between the neurons in the layer of the neural network. The act 1206 can further involve determining cosine similarities between the gradient losses for the given neuron and the gradient losses of other neurons in the layer. In addition, the act 1206 can involve generating, for one or more neurons within a penultimate layer of the neural network, a combination of the determined cosine similarities that indicates similarities between the one or more neurons within the penultimate layer and other neurons within the penultimate layer.

Furthermore, the series of acts 1200 includes an act 1208 of determining dynamic dropout probability. In particular, the act 1208 can involve determining a dynamic dropout probability distribution for the neurons in the layer. The act 1208 can further involve determining, for the one or more neurons within the penultimate layer, probabilities of learning similar features to other neurons within the penultimate layer. Additionally, the act 1208 can involve determining, based on the probabilities of the one or more neurons learning similar features to other neurons within the penultimate layer, probabilities of dropping out the one or more neurons within the penultimate layer. In particular, act 1208 can involve determining a dropout probability for a given neuron by subtracting a lowest similarity score from the layer from a similarly score for the given neuron and dividing a result by a difference between a maximum similarly score for the layer and the minimum similarity score.

Further still, the series of acts 1200 includes an act 1210 of generating a trained neural network. In particular, the act 1210 can involve generating, based using the dynamic dropout probability distribution during training, a trained neural network comprising neurons that learn distinguishable features. The act 1210 can involve implementing a dropout routine in accordance with the dynamic dropout probability distribution. In particular, the act 1210 can involve dropping neurons with probabilities of learning similar features to other neurons of the neural network during a given training cycle. More particularly, after determining the dynamic dropout probability, the act 1210 can involve probabilistically selecting which neurons to drop out in a given training cycle based on the dynamic dropout probability. During back propagation for the training cycle, the weights of the dropped neurons are not updated so as to force similar neurons to learn distinctive features. During the next training cycle, the previously dropped neurons are added back into the neural network and acts 1204-1208 are repeated to intelligently identify and drop neurons with probabilities of learning similar features to other neurons of the neural network based on the updated weights. Act 1210 can involve iteratively repeating training cycles (and intelligently choosing which neurons to drop during each training cycle) until the neural network converges or another stopping condition is met (e.g., the determined losses are within a predetermined threshold or a given number of epochs is performed).

For example, in one implementation, act 1210 can involve probabilistically selecting a set of neurons to drop during the training iteration based on the dynamic dropout probability distribution. Act 1210 can then involve generating an updated set of weights by back propagating the gradient losses to modify weights of the neurons of the neural network other than the neurons in the set of neurons selected to drop. Act 1210 can also involve providing second training input to the neural network for a second training iteration. Act 1210 can involve determining, for the plurality of classification labels, second gradient losses associated with neurons of one or more layers of the neural network based on the training input using the updated set of weights. Act 1210 can then involve generating, based on the second gradient losses, second similarity scores between the neurons in the one or more layers of the neural network and determining, based on the second similarity scores, a second dynamic dropout probability distribution for the neurons in the one or more layers. Act 1210 can involve probabilistically selecting a second set of neurons to drop during the training iteration based on the dynamic dropout probability distribution; and back propagating the second gradient losses to modify the updated set of weights of the neurons of the neural network other than the neurons in the second set of neurons selected to drop.

Turning now to FIG. 13, an example series of acts 1300 of generating a trained neural network based on a cyclic learning rate routine is shown. In particular, the series of acts 1300 includes an act 1302 of accessing a neural network. For example, the act 1302 can involve accessing a neural network comprising a plurality of weights that indicate decision boundaries associated with the neural network.

As shown, the series of acts 1300 includes an act 1304 of initializing a copy of the neural network. In particular, the act 1304 can involve initializing a copy neural network with copy weights set equal to the weights of the neural network.

In addition, the series of acts 1300 includes an act 1306 of implementing a cyclic learning rate. In particular, the act 1306 can involve implementing a cyclic learning rate routine to force the copy weights away from the weights of the neural network without decreasing prediction accuracy by oscillating, for a plurality of training iterations over one or more cycles, a learning rate of the copy neural network between a first learning rate and a second learning rate. In addition, the act 1306 can involve oscillating the learning rate between the first learning rate and the second learning in accordance with a learning rate function. A cycle can include a period of modifying the learning rate from the first learning rate to the second learning rate and back to the first learning rate.

Further, the series of acts 1300 includes an act 1308 of generating cyclically trained neural networks. In particular, the act 1308 can involve generating, based on the cyclic learning rate routine, a plurality of cyclically trained neural networks with distinct decision boundaries. The act 1308 can further involve generating cyclic weights for each of the plurality of cyclically trained neural networks. Generating the cyclic weights can include generating the cyclic weights associated with the plurality of cyclically trained neural networks by sampling the copy weights at a sampling point of each of the one or more cycles. The sampling point can include a midpoint of each of the one or more cycles. Distinct decision boundaries can include decision boundaries that delineate distinguishable neural network predictions. Additionally, each of the plurality of cyclically trained neural networks have training accuracies within a tolerance of each other.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
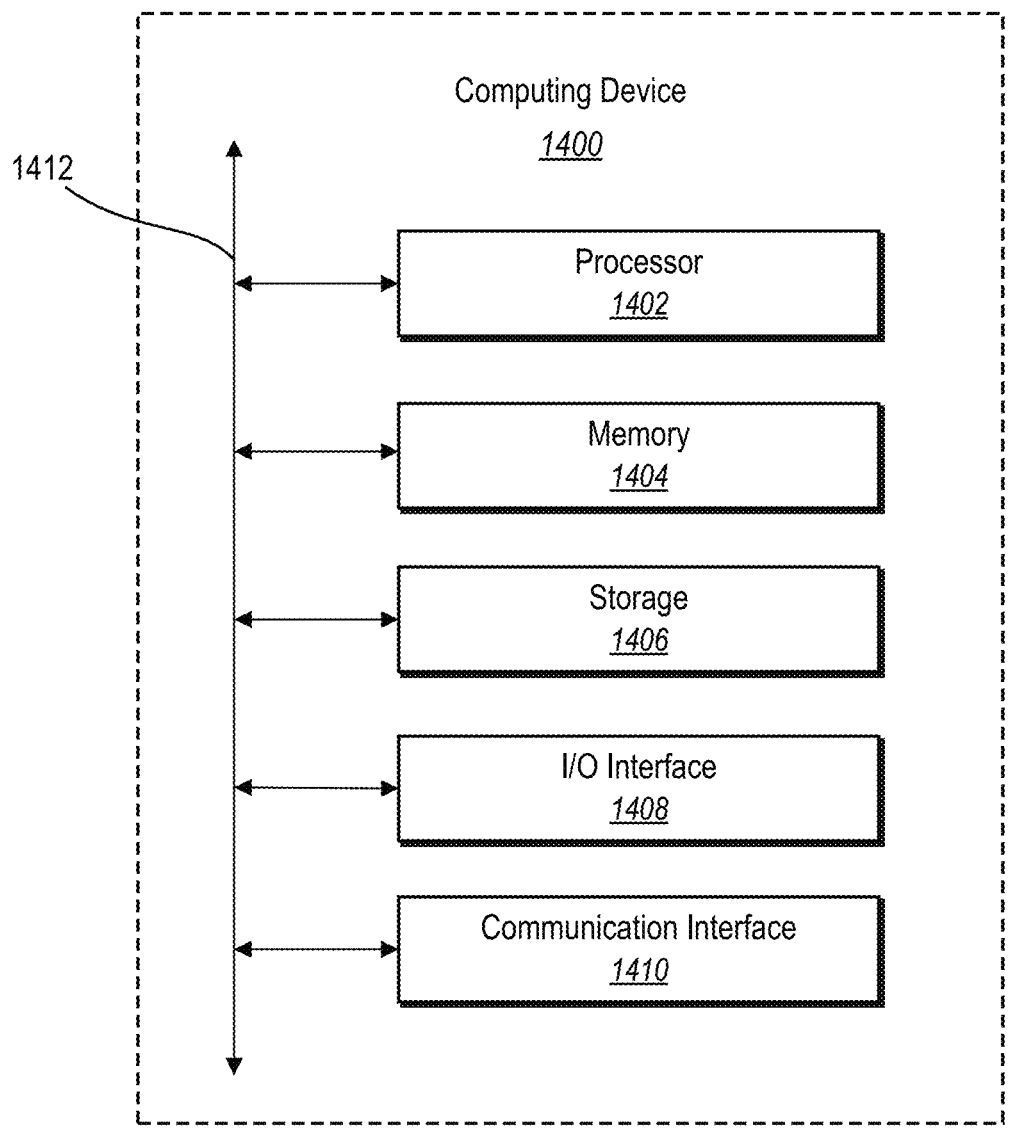
FIG. 14 illustrates a block diagram of an example computing device in accordance with one or more embodiments.

FIG. 14 illustrates, in block diagram form, an example computing device 1400 (e.g., the computing device 1100, the client device 108, and/or the server(s) 104) that may be configured to perform one or more of the processes described above. One will appreciate that the adversarially-robust neural-network training system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor;
   a neural network comprising a plurality of layers, wherein each layer of the plurality of layers comprises one or more neurons;
   a plurality of training data; and
   a non-transitory computer readable medium comprising instructions that, when executed by the at least one processor, cause the system to:
   provide training input from the plurality of training data to the neural network for a training iteration;
   determine, for a plurality of classification labels, gradient losses associated with neurons of a layer of the neural network based on the training input;
   generate, based on the gradient losses, similarity scores between the neurons in the layer of the neural network;
   determine, based on the similarity scores, a dynamic dropout probability distribution for the neurons in the layer; and
   generate, based on the dynamic dropout probability distribution, a trained neural network more robust to adversarial attacks.

2. The system of claim 1, further comprising instructions that, when executed by the at least one processor, cause the system to determine the gradient losses by determining, for a given neuron, a gradient loss for each of the plurality of classification labels.

3. The system of claim 2, further comprising instructions that, when executed by the at least one processor, cause the system to generate the similarity scores by determining cosine similarities between the gradient losses for the given neuron and the gradient losses of other neurons in the layer.

4. The system of claim 3, wherein the layer is a penultimate layer of the neural network.

5. The system of claim 1, wherein the instructions, when executed by the at least one processor, cause the system to determine, for the plurality of classification labels, the gradient losses associated with the neurons of the layer of the neural network based on the training input by using a cost function to compare a predicted output form the neural network with a ground truth.

6. The system of claim 1, wherein the instructions, when executed by the at least one processor, cause the system to determine, based on the similarity scores, the dynamic dropout probability distribution for the neurons in the layer by determining a dropout probability for a given neuron by subtracting a lowest similarity score from the layer from a similarly score for the given neuron and dividing a result by a difference between a maximum similarly score for the layer and the lowest similarity score.

7. The system of claim 1, wherein the instructions, when executed by the at least one processor, cause the system to generate the trained neural network by probabilistically selecting a set of neurons to drop during the training iteration based on the dynamic dropout probability distribution.

8. The system of claim 7, further comprising instructions that, when executed by the at least one processor, cause the system to generate an updated set of weights by back propagating the gradient losses to modify weights of the neurons of the neural network other than the neurons in the set of neurons selected to drop.

9. The system of claim 8, further comprising instructions that, when executed by the at least one processor, cause the system to:
   provide second training input to the neural network for a second training iteration;
   determine, for the plurality of classification labels, second gradient losses associated with neurons of one or more layers of the neural network based on the training input using the updated set of weights;
   generate, based on the second gradient losses, second similarity scores between the neurons in the one or more layers of the neural network;
   determine, based on the second similarity scores, a second dynamic dropout probability distribution for the neurons in the one or more layers;
   probabilistically selecting a second set of neurons to drop during the training iteration based on the dynamic dropout probability distribution; and
   back propagating the second gradient losses to modify the updated set of weights of the neurons of the neural network other than the neurons in the second set of neurons selected to drop.

* * * * *